(12) United States Patent
Kim et al.

(10) Patent No.: US 10,635,300 B2
(45) Date of Patent: Apr. 28, 2020

(54) ELECTRONIC DEVICE AND CONTROL METHOD THEREFOR

(71) Applicant: LG ELECTRONICS INC., Seoul (KR)

(72) Inventors: Sumi Kim, Seoul (KR); Byoungjin Park, Seoul (KR); Jinho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

(21) Appl. No.: 15/740,685

(22) PCT Filed: Aug. 5, 2015

(86) PCT No.: PCT/KR2015/008202
§ 371 (c)(1),
(2) Date: Dec. 28, 2017

(87) PCT Pub. No.: WO2017/003011
PCT Pub. Date: May 1, 2017

(65) Prior Publication Data
US 2018/0188941 A1     Jul. 5, 2018

(30) Foreign Application Priority Data

Jun. 29, 2015   (KR) ........................ 10-2015-0092120

(51) Int. Cl.
*G06F 3/045* (2006.01)
*G06F 3/0488* (2013.01)
(Continued)

(52) U.S. Cl.
CPC .......... *G06F 3/04883* (2013.01); *G06F 3/038* (2013.01); *G06F 3/0321* (2013.01);
(Continued)

(58) Field of Classification Search
USPC ..... 345/179, 156, 173, 174; 700/94; 381/56, 381/57
See application file for complete search history.

(56) References Cited

U.S. PATENT DOCUMENTS 5,566,678 A * 10/1996 Cadwell ............... A61B 5/0432
600/544
5,730,602 A * 3/1998 Gierhart ................ G09B 11/00
345/179

(Continued)

FOREIGN PATENT DOCUMENTS

KR   10-2014-0093553 A   7/2014
KR   10-2015-0025696 A   3/2015

*Primary Examiner* — Thuy N Pardo
(74) *Attorney, Agent, or Firm* — Birch, Stewart, Kolasch & Birch, LLP

(57) ABSTRACT

An electronic device including a housing having a grip portion for gripping the electronic device to input content; a microphone included in the housing; a memory included in the housing; a sensor located at one side of the housing and configured to sense movement of the electronic device corresponding to the input content; and a controller configured to operate in a first mode in which a sound acquired through the microphone and the content input by the electronic device are stored in the memory, operate in a second mode in which the sound stored in the memory is reproduced, and operate in a third mode in which at least a portion of the stored sound is editable according to a gesture acquired through the sensor.

21 Claims, 34 Drawing Sheets

(51) Int. Cl.
*G06F 3/038* (2013.01)
*G06F 3/03* (2006.01)
*G06F 3/0354* (2013.01)
*G06F 3/16* (2006.01)
*G06F 3/01* (2006.01)

(52) U.S. Cl.
CPC .......... *G06F 3/03545* (2013.01); *G06F 3/167* (2013.01); *G06F 3/013* (2013.01)

(56) References Cited

U.S. PATENT DOCUMENTS

| | | |
|---|---|---|
| 8,446,298 B2 | 5/2013 | Marggraff et al. |
| 8,941,606 B2 * | 1/2015 | Fujibayashi ........ G06F 3/04847 345/156 |
| 2009/0021495 A1 | 1/2009 | Edgecomb et al. |
| 2009/0190767 A1 * | 7/2009 | Aaron ...................... H03G 3/32 381/57 |
| 2009/0251440 A1 | 10/2009 | Edgecomb et al. |
| 2010/0318203 A1 * | 12/2010 | Brooks ............... H04M 1/6033 700/94 |
| 2013/0285974 A1 * | 10/2013 | Nakabayashi .......... G06F 3/044 345/174 |
| 2014/0267076 A1 * | 9/2014 | Birnbaum ............. B25J 13/025 345/173 |
| 2016/0150333 A1 * | 5/2016 | Goldstein ............ G06F 16/686 381/56 |

* cited by examiner

[Figure 1]
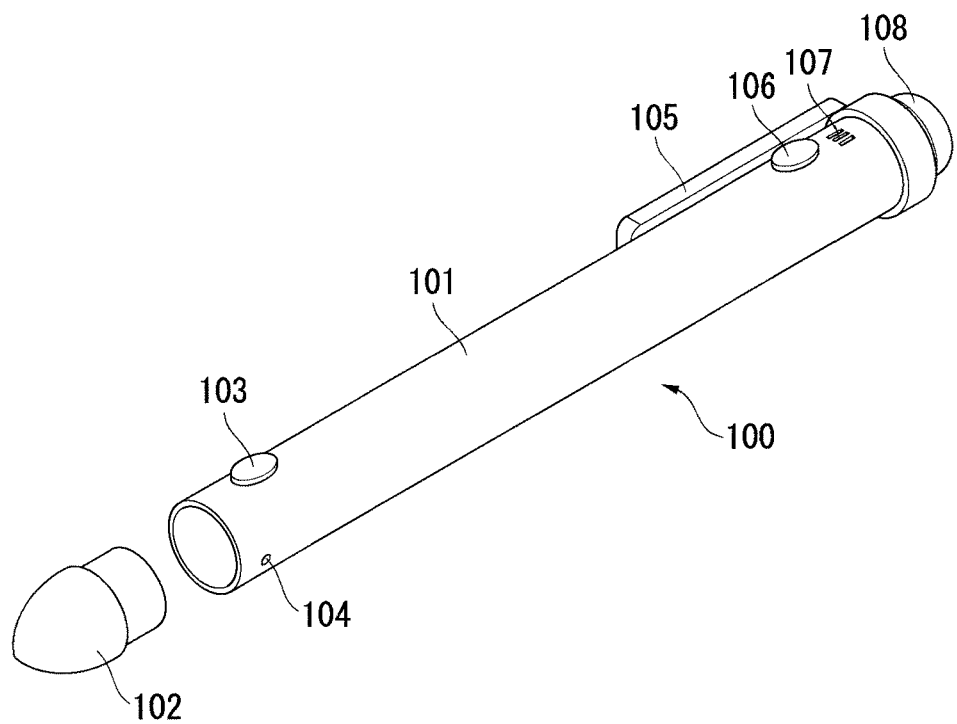

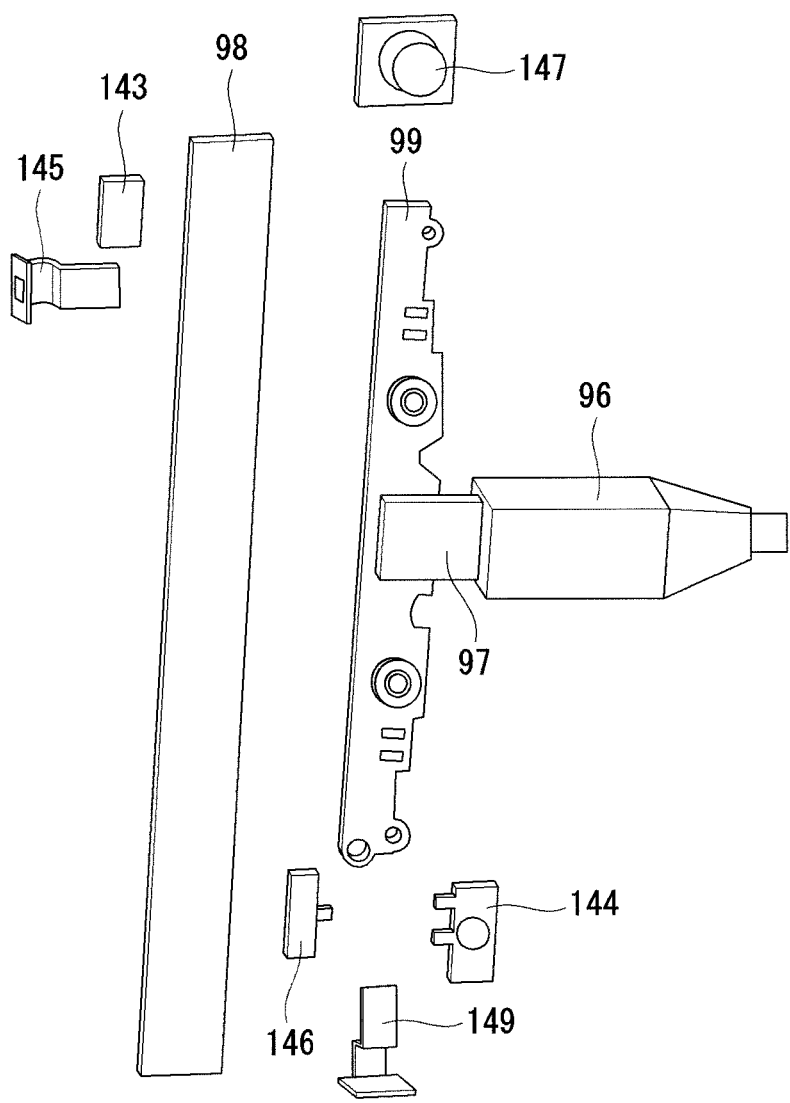
[Figure 2]

[Figure 3]
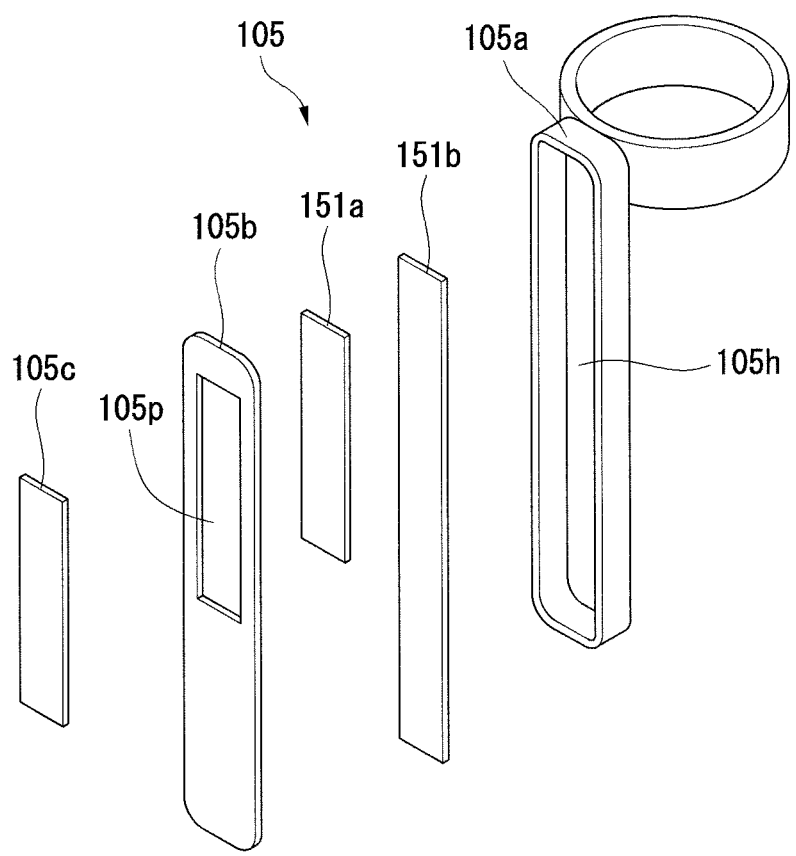

[Figure 4]
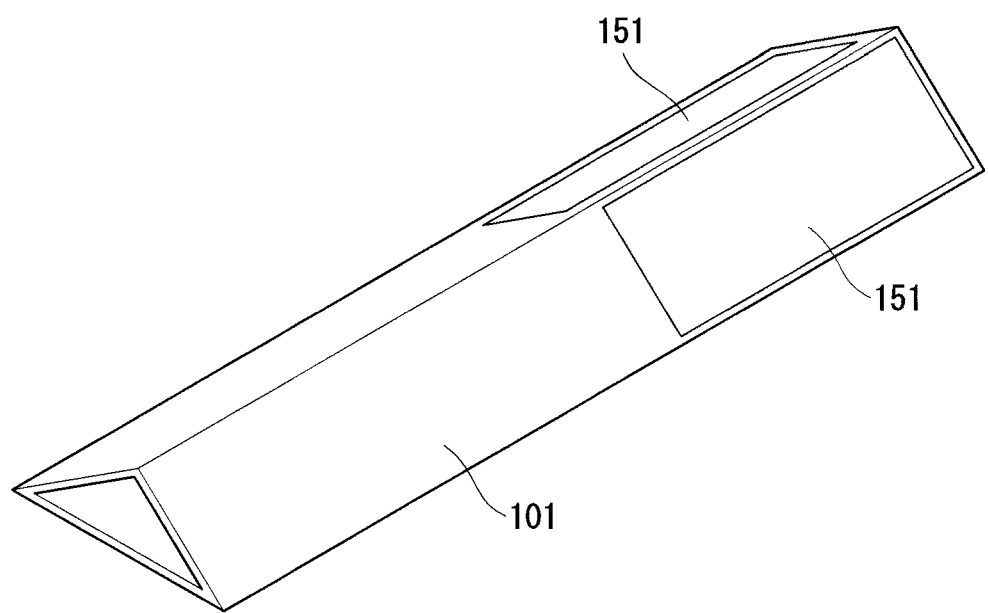

[Figure 5]
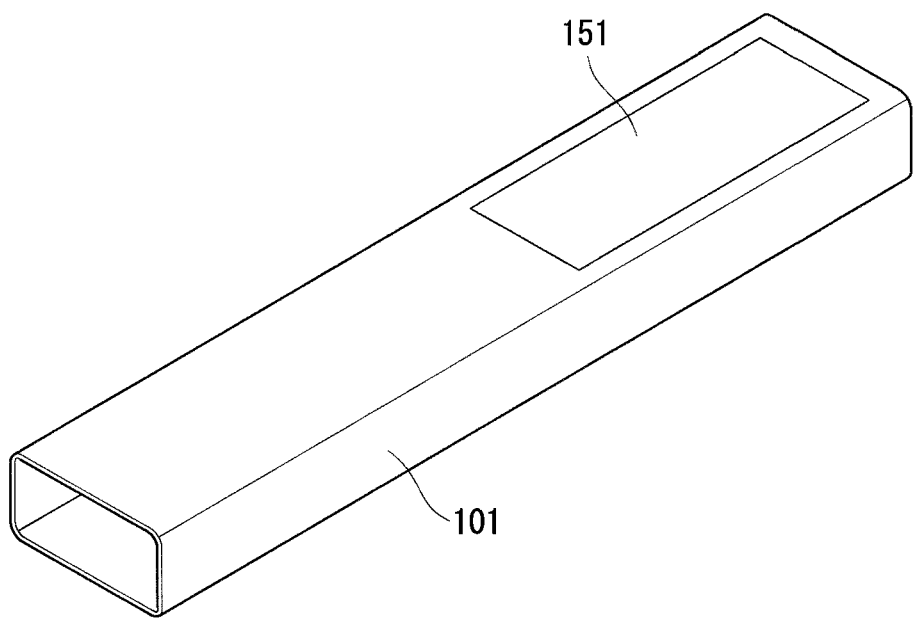

[Figure 6]
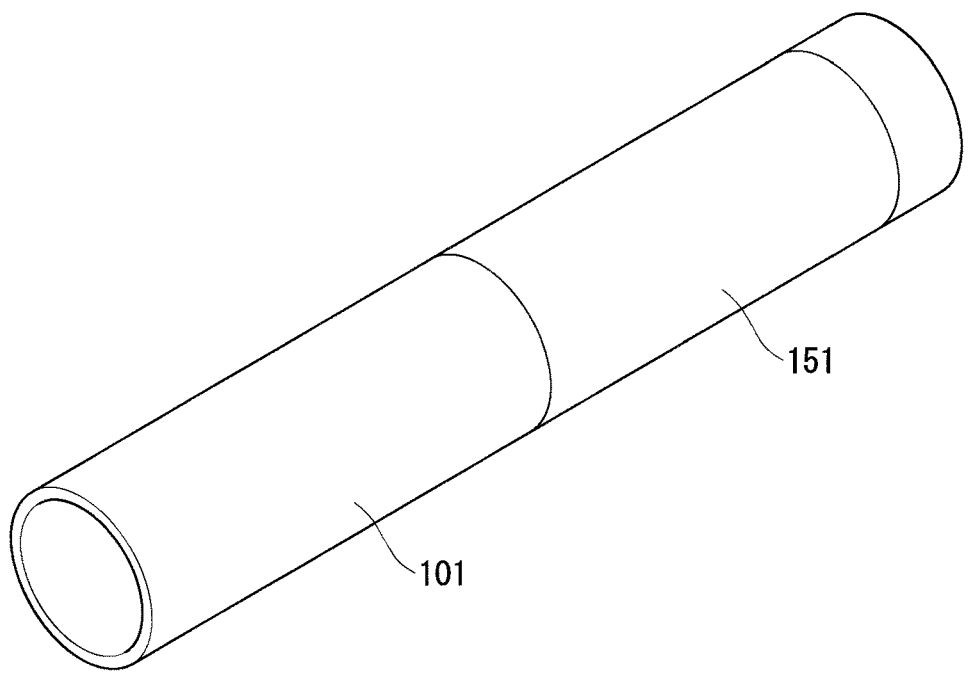

[Figure 7]
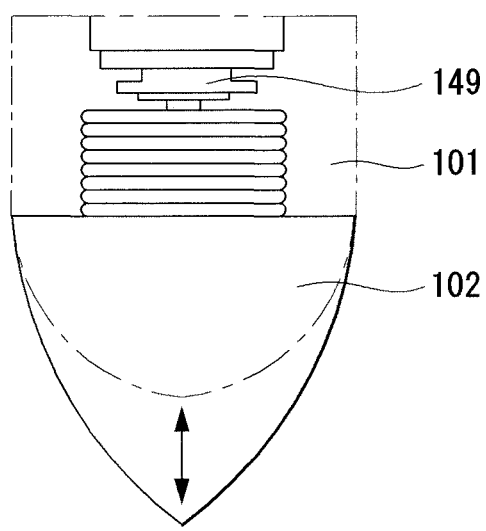

[Figure 8]
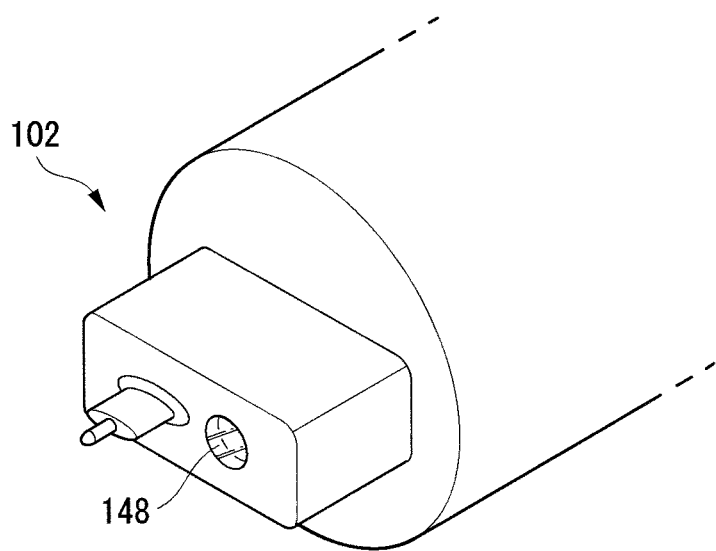

[Figure 9]
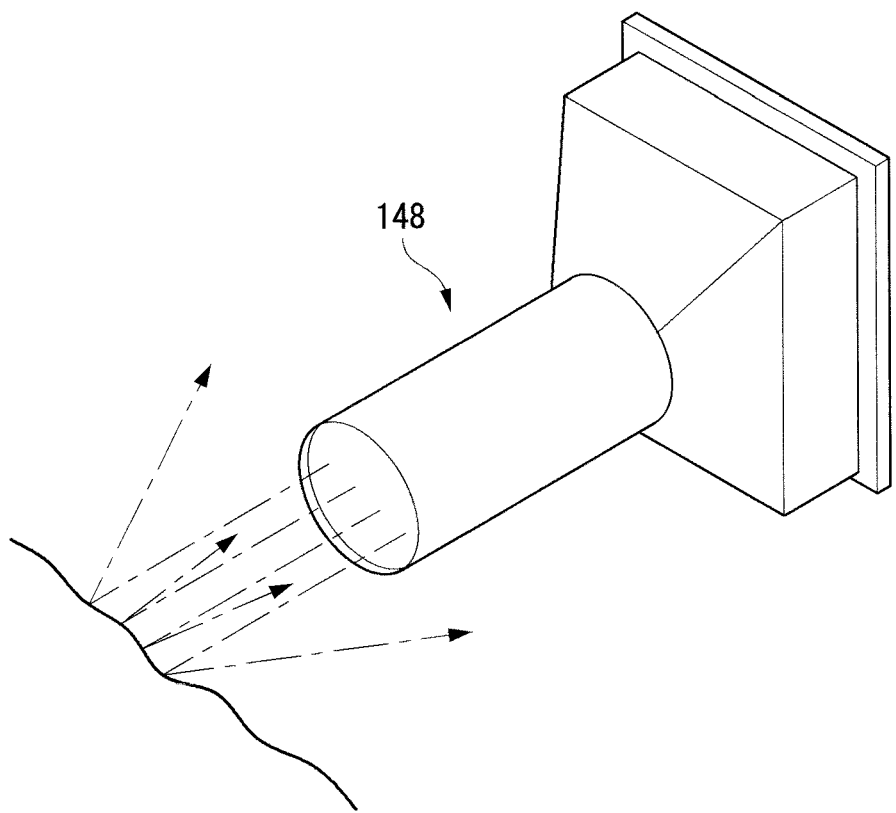

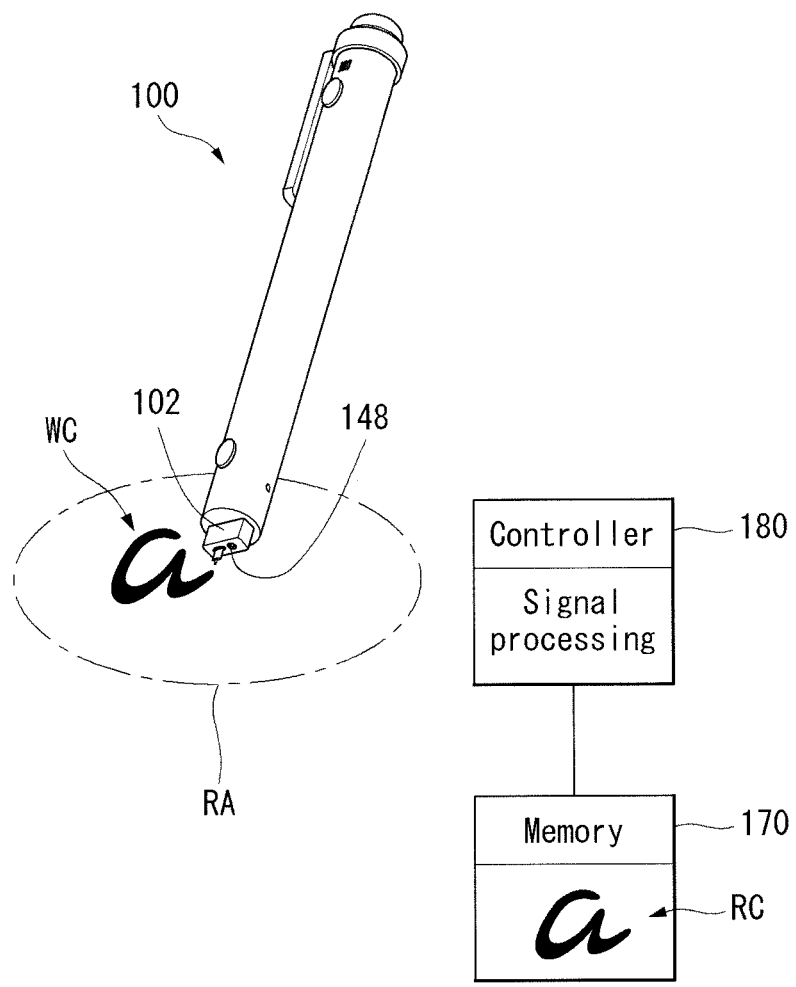
【Figure 10】

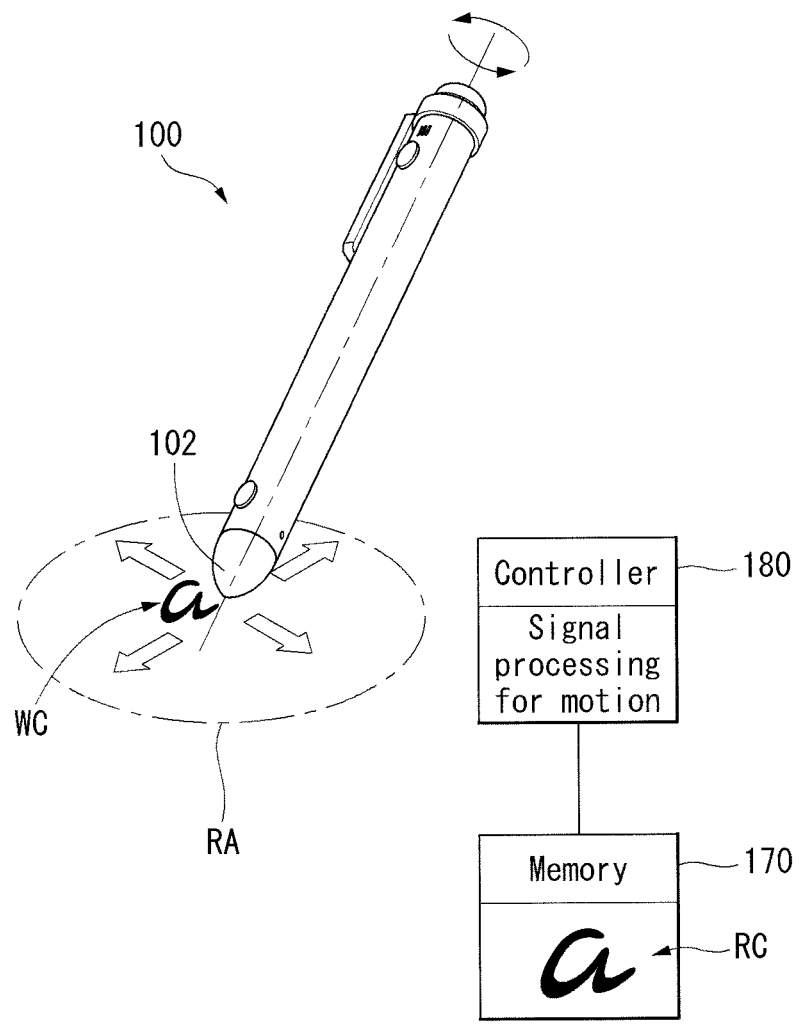
【Figure 11】

【Figure 12】
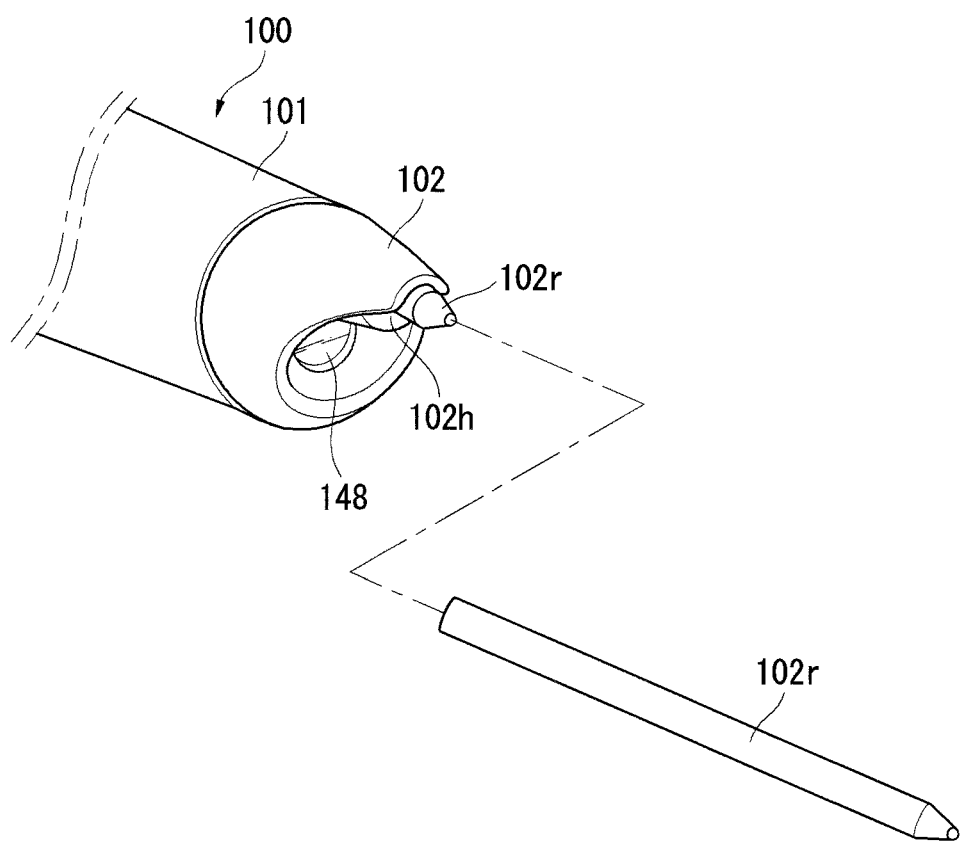

【Figure 13】
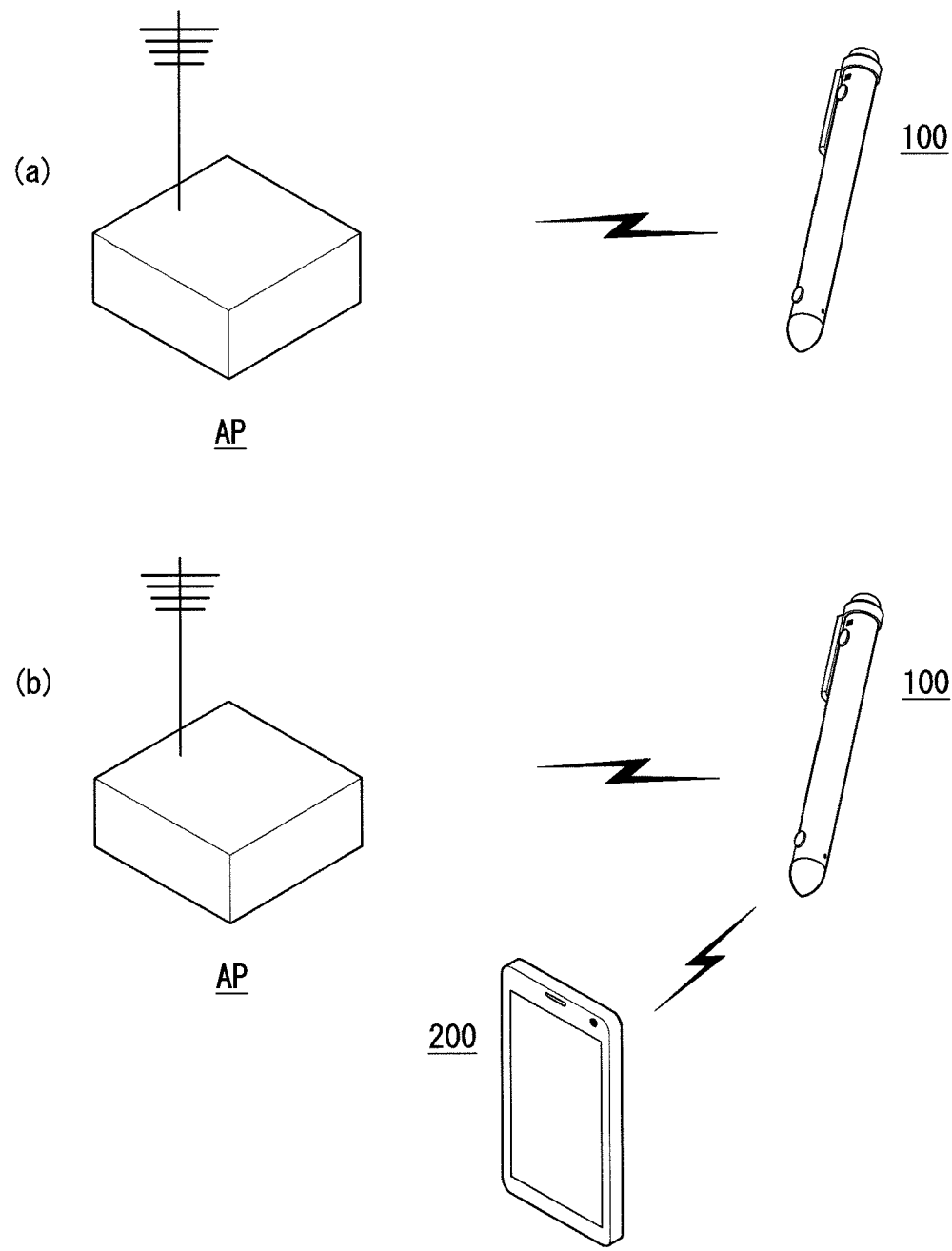

【Figure 14】
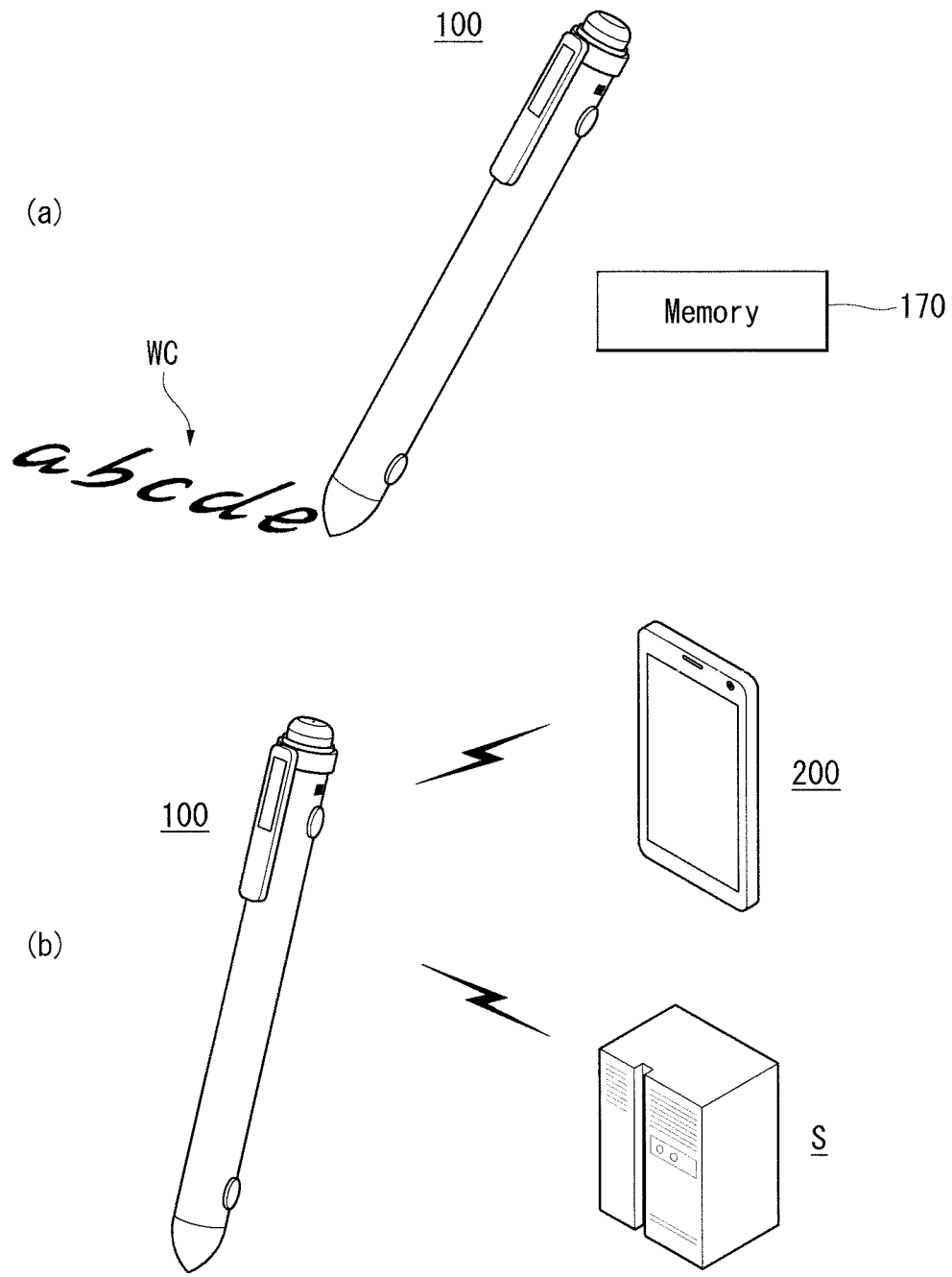

[Figure 15]
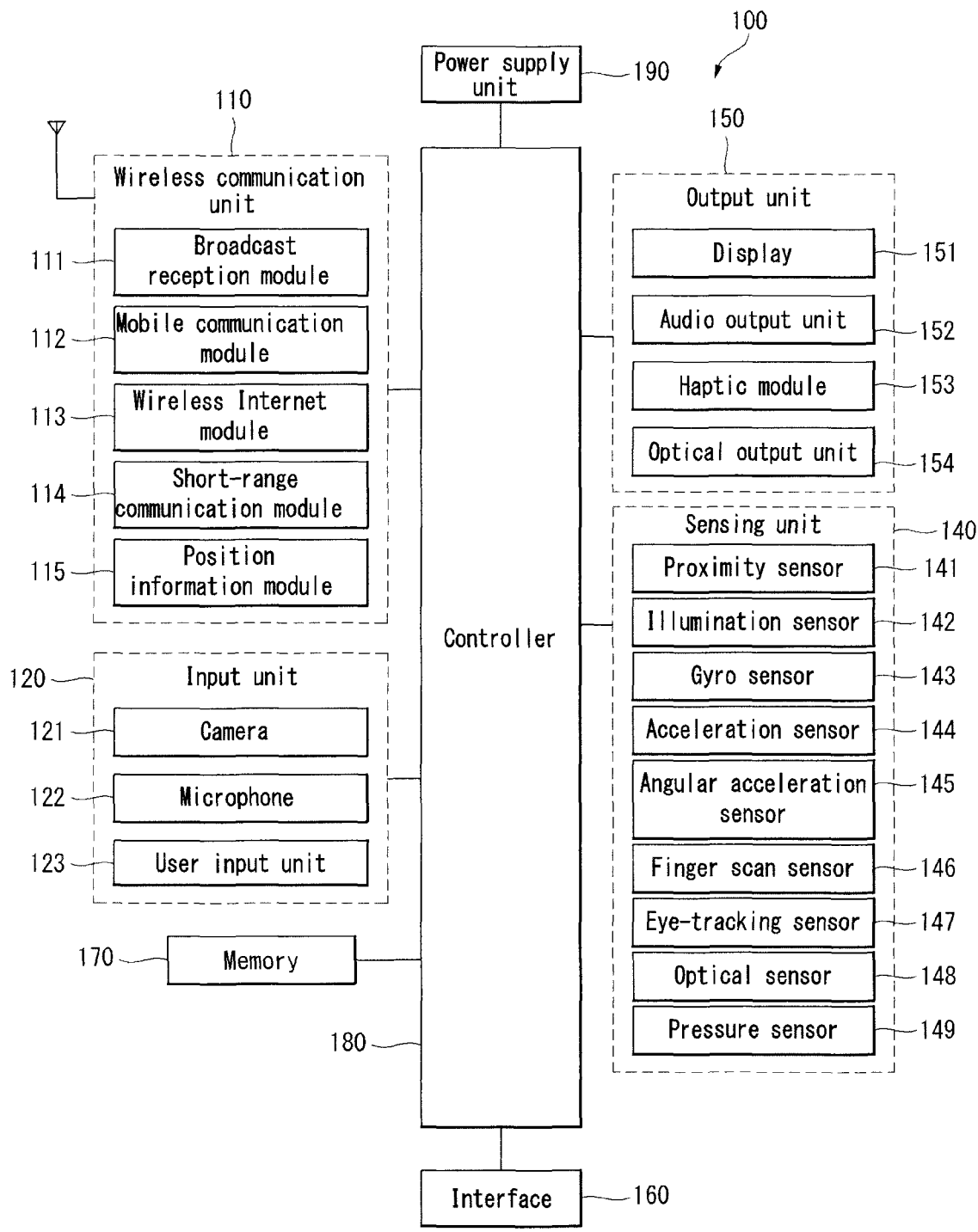

[Figure 16]
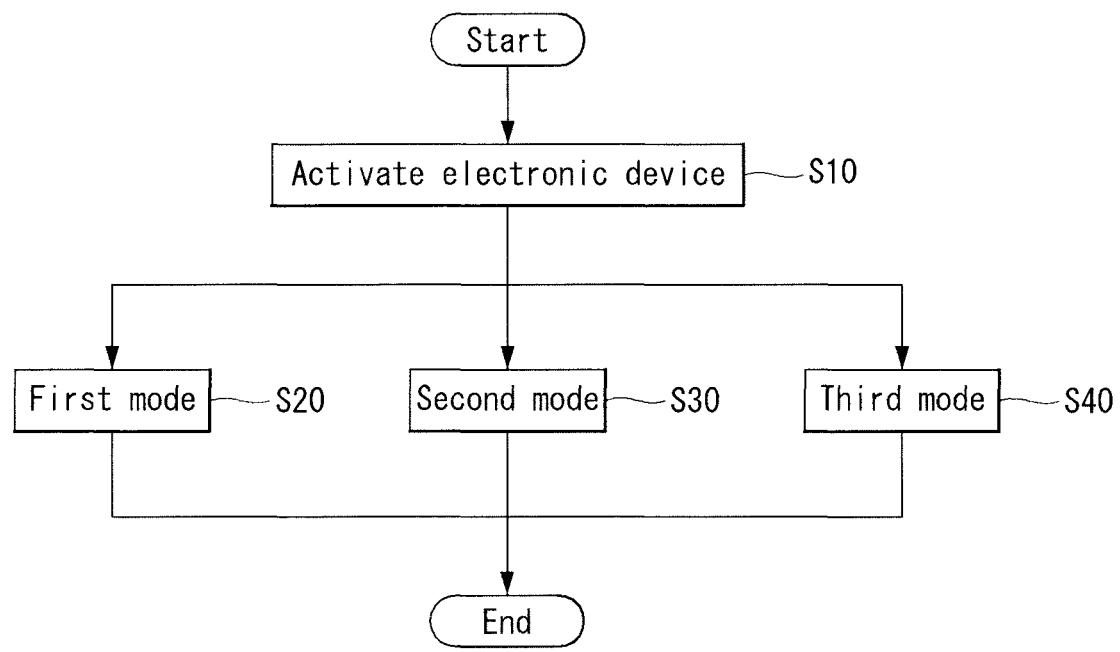

[Figure 17]
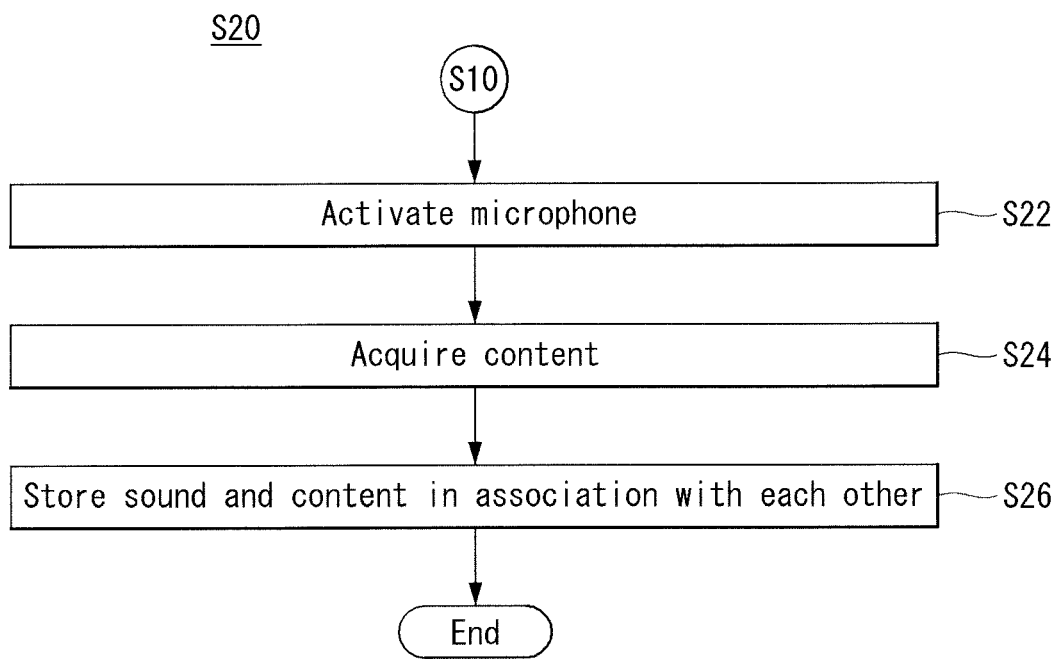

[Figure 18]
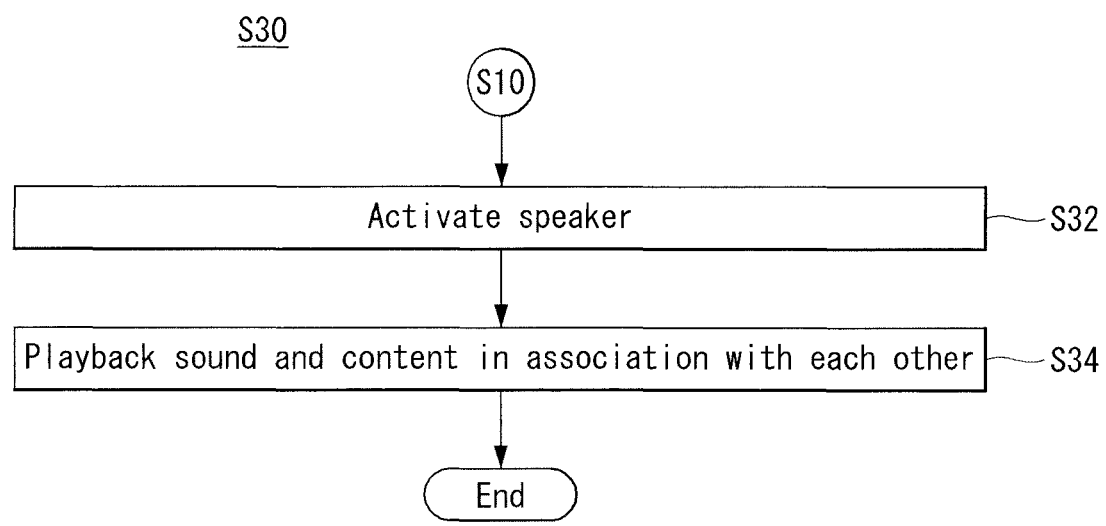

[Figure 19]
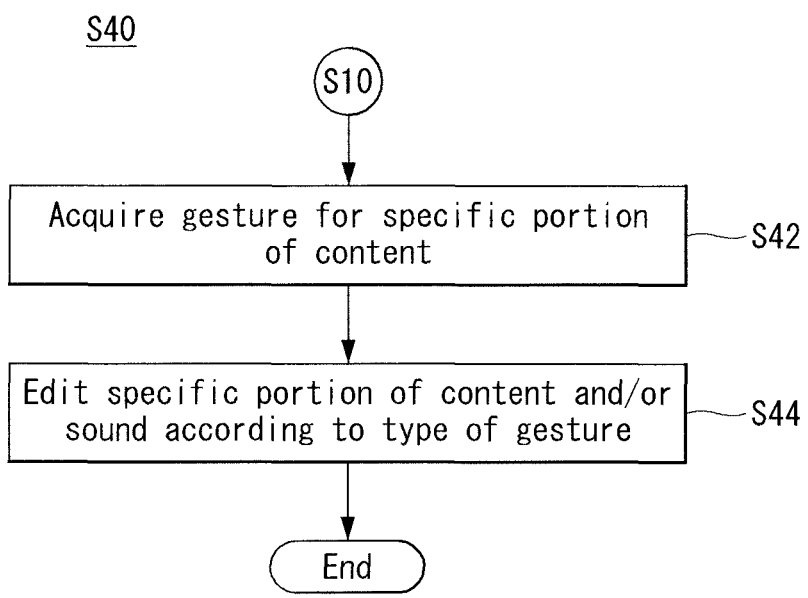

【Figure 20】
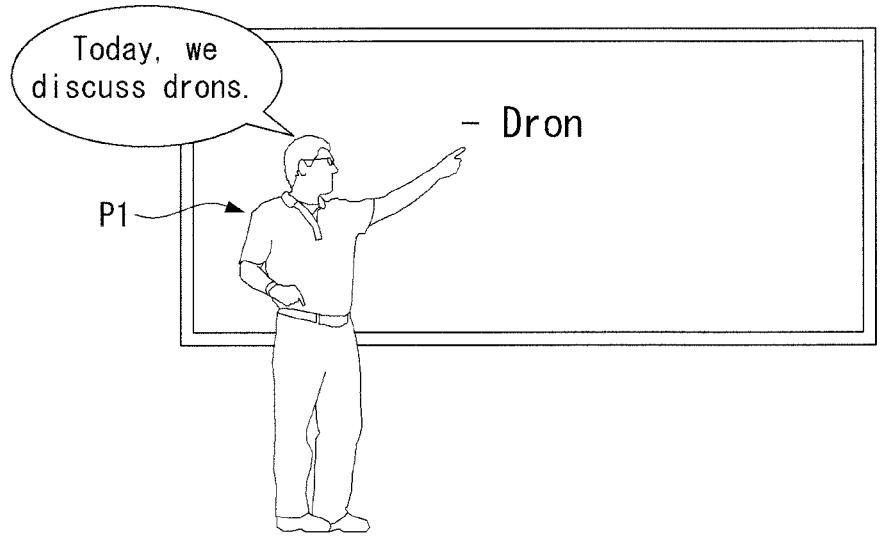
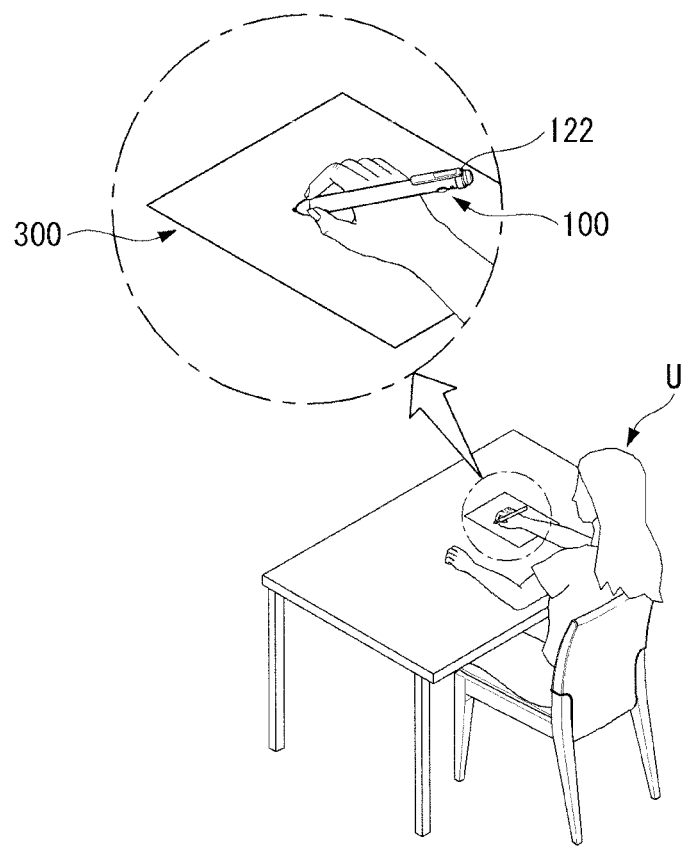

[Figure 21]
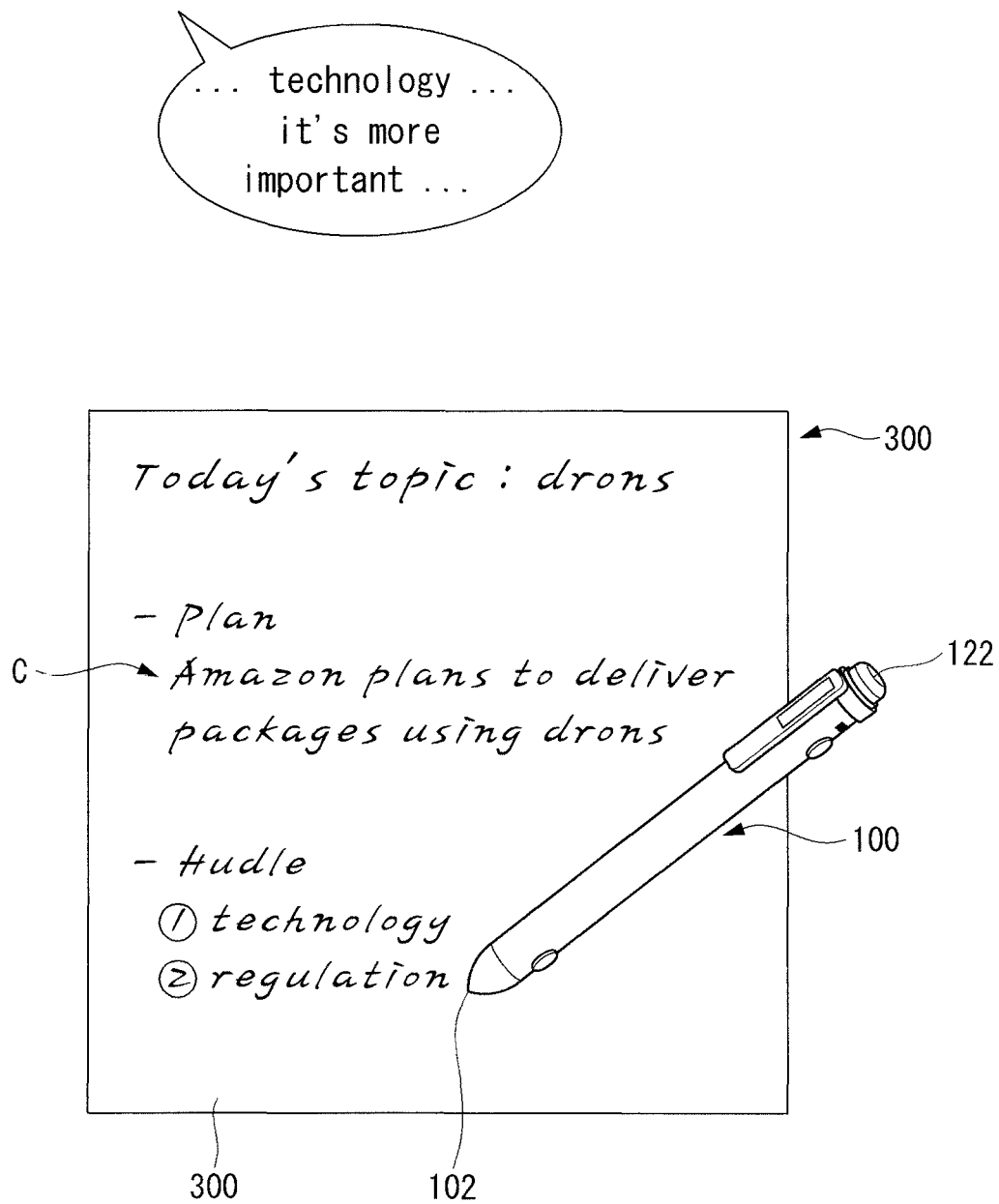

[Figure 22]
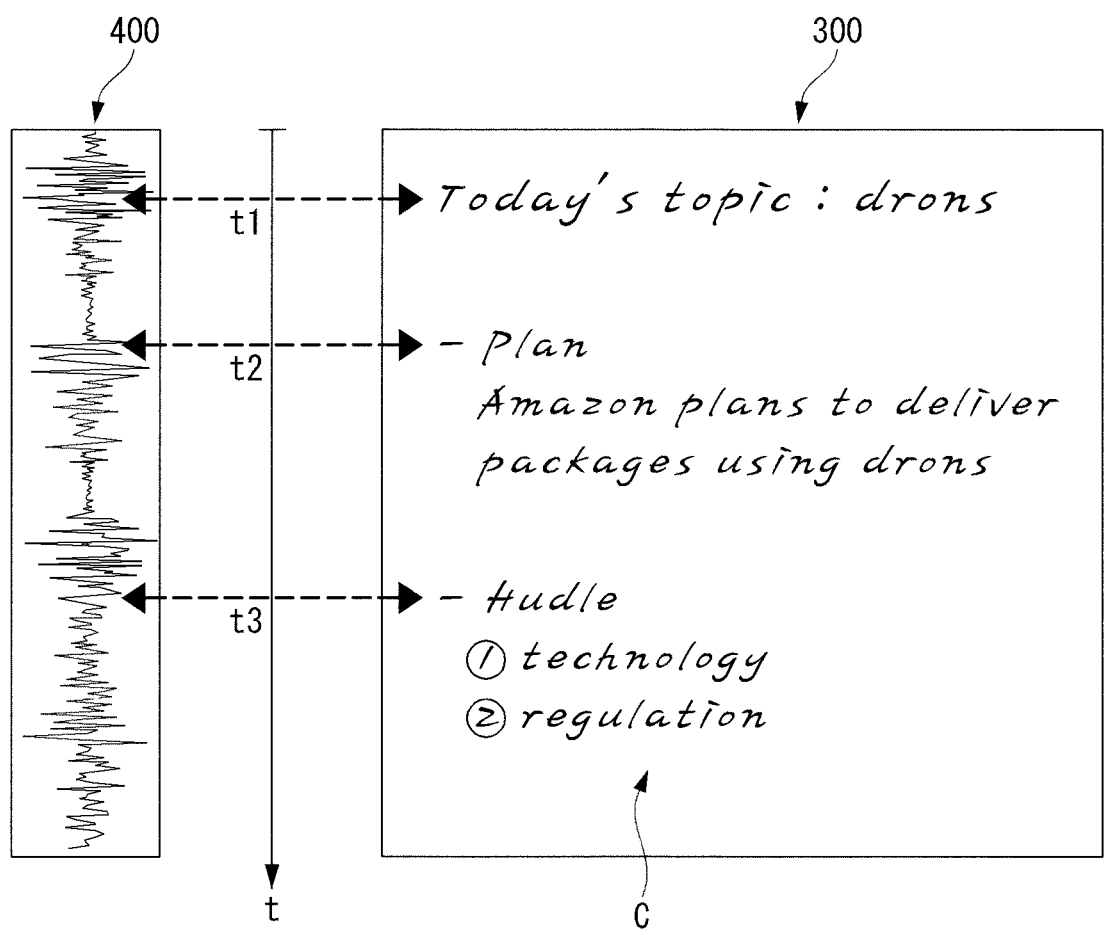

[Figure 23]
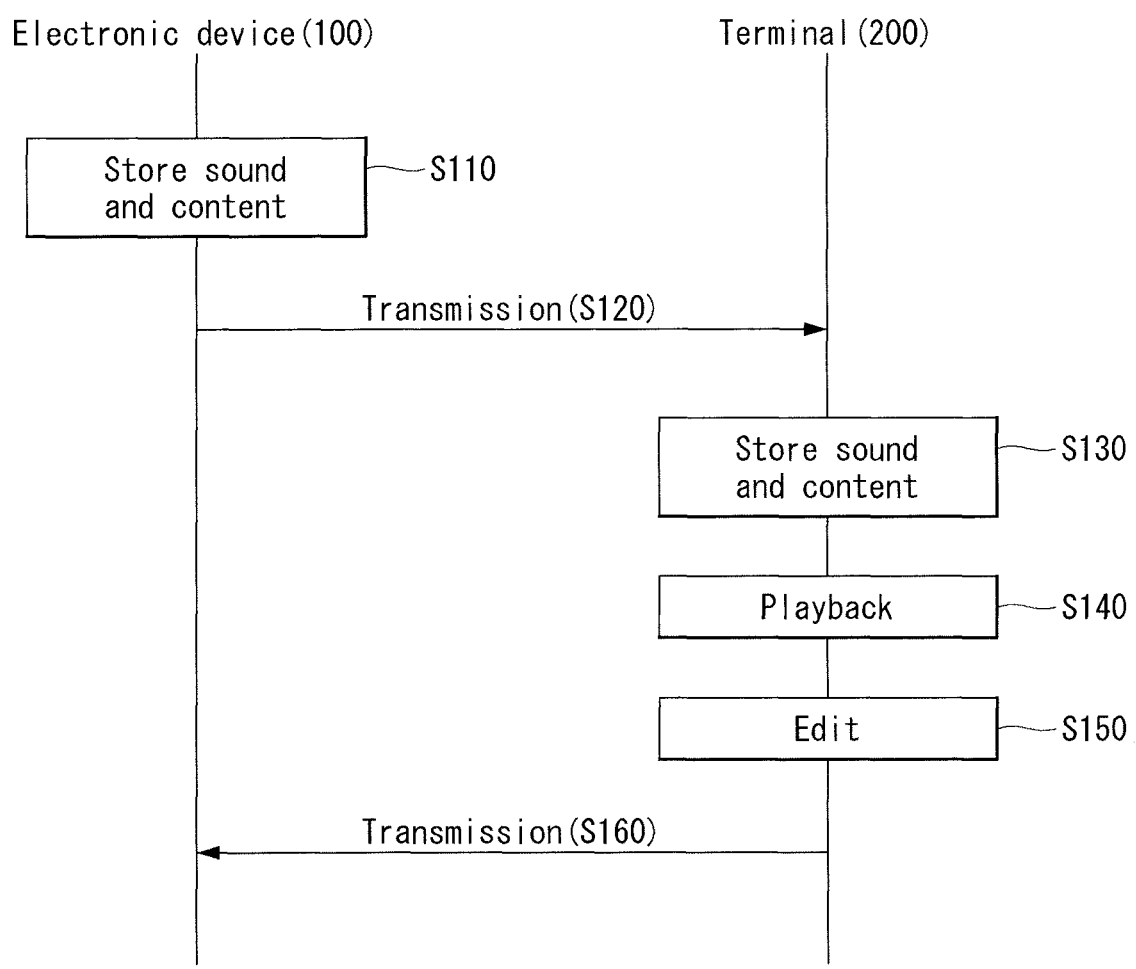

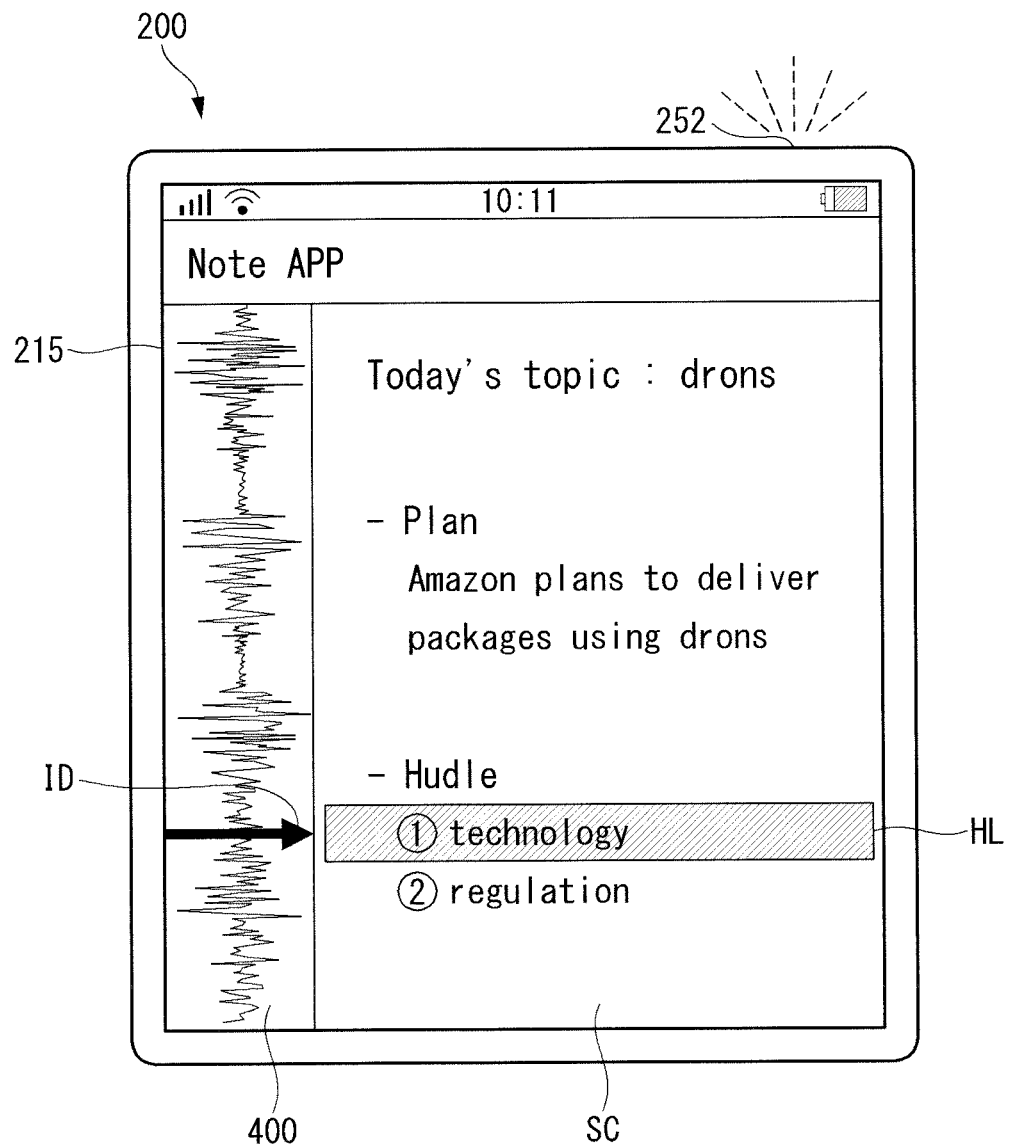
[Figure 24]

[Figure 25]
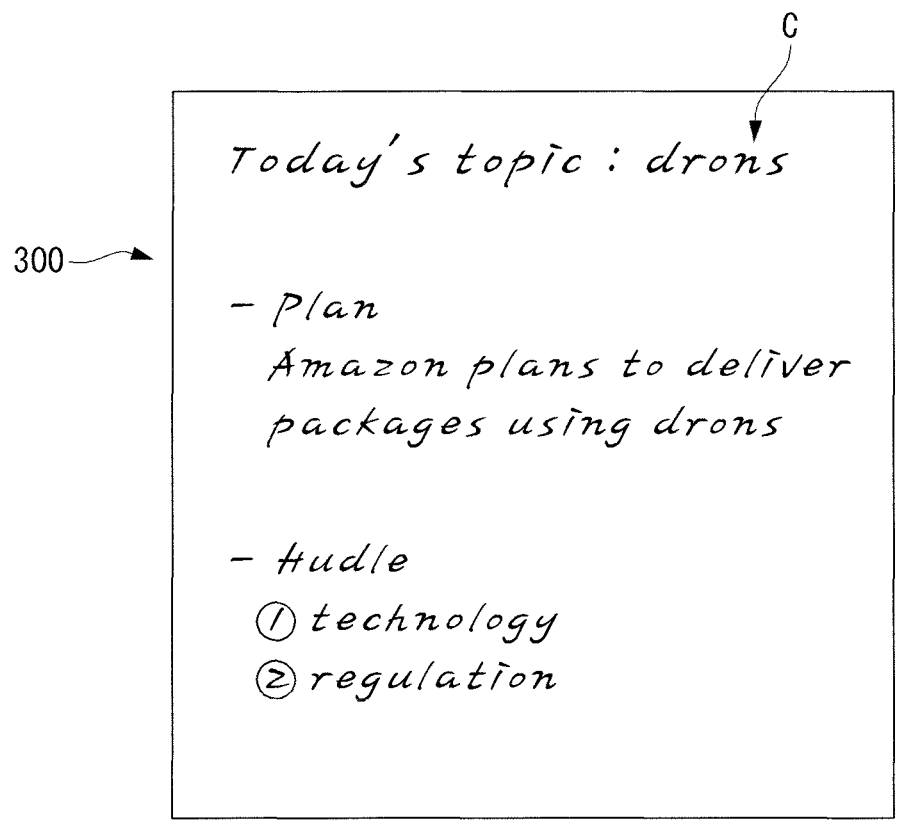
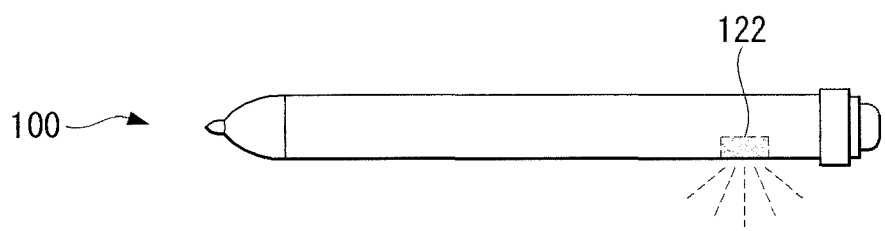

【Figure 26】
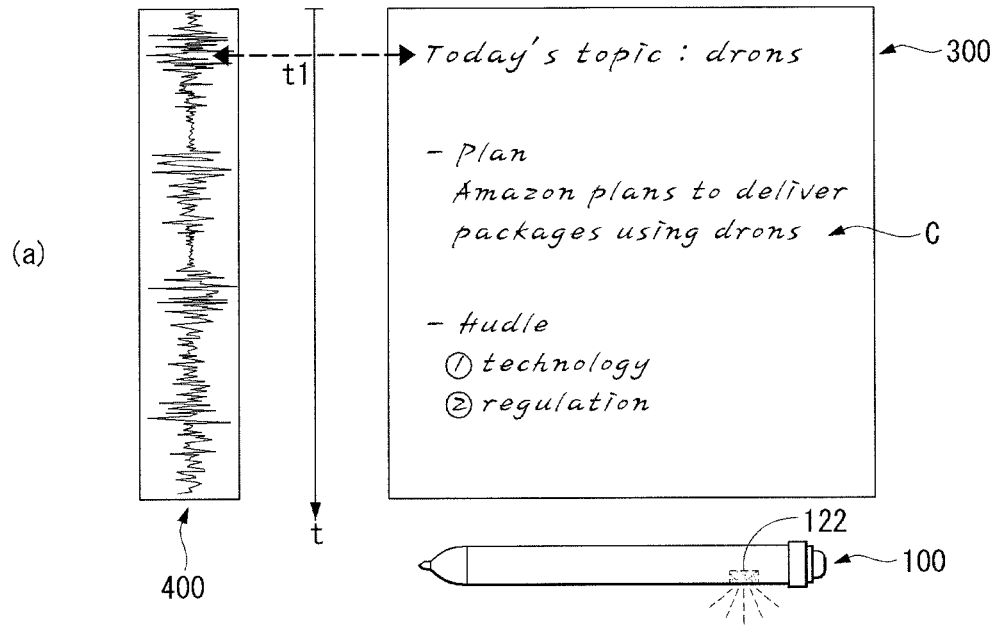
(a)
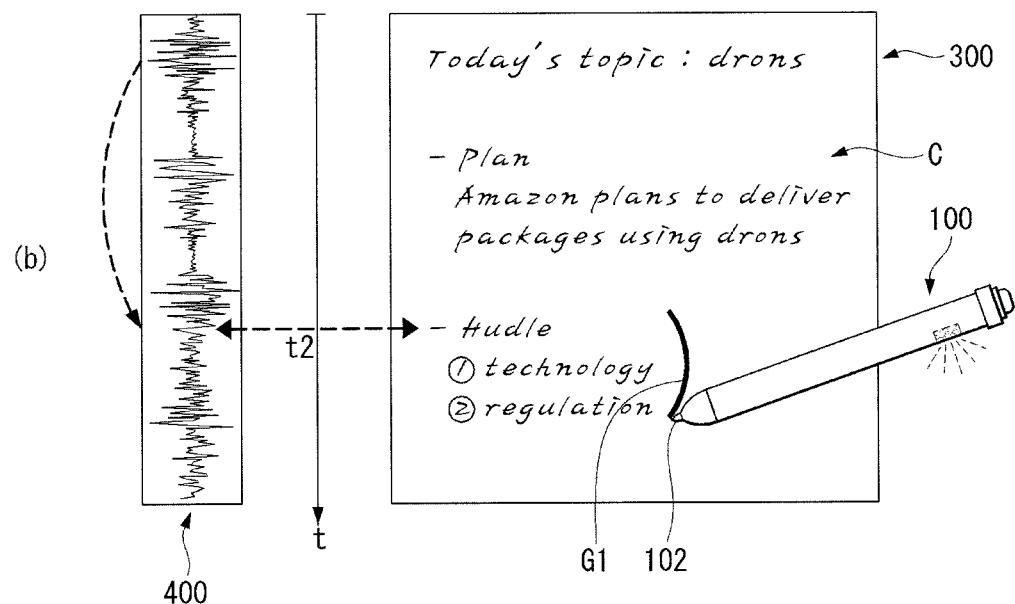
(b)

【Figure 27】
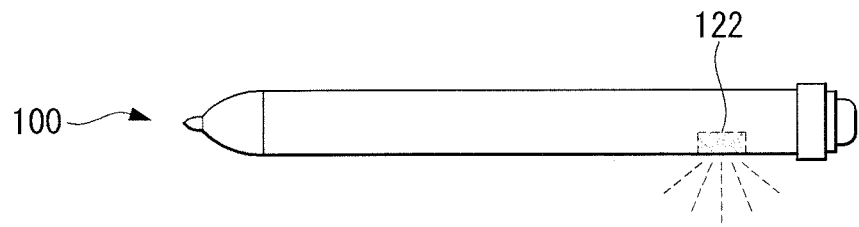
... regulation is the most important factor, so from now let's focus on this factor...

[Figure 28]
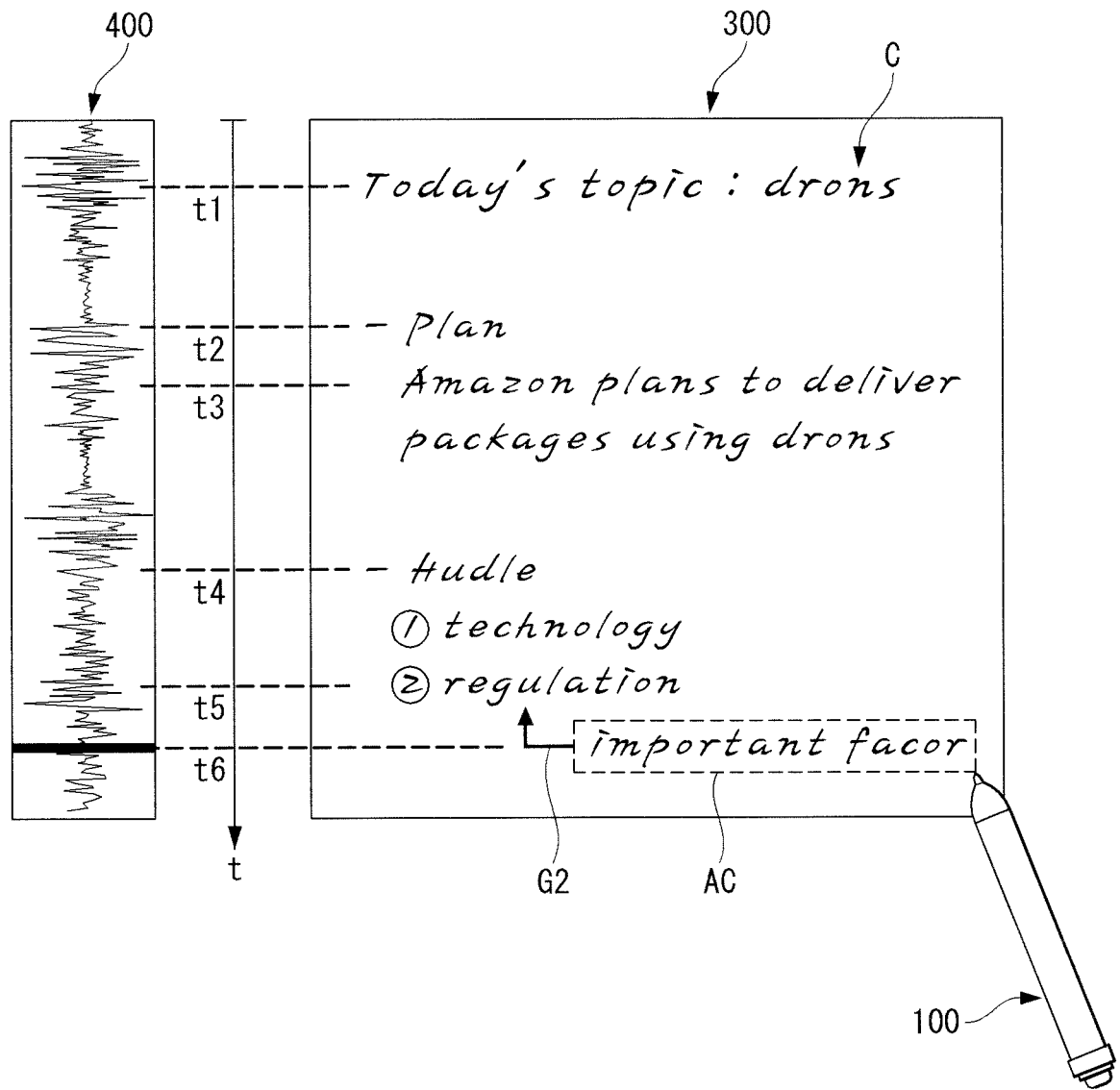

【Figure 29】
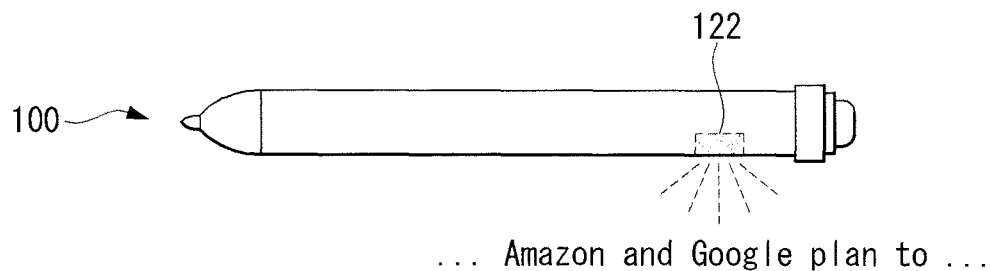
... Amazon and Google plan to ...
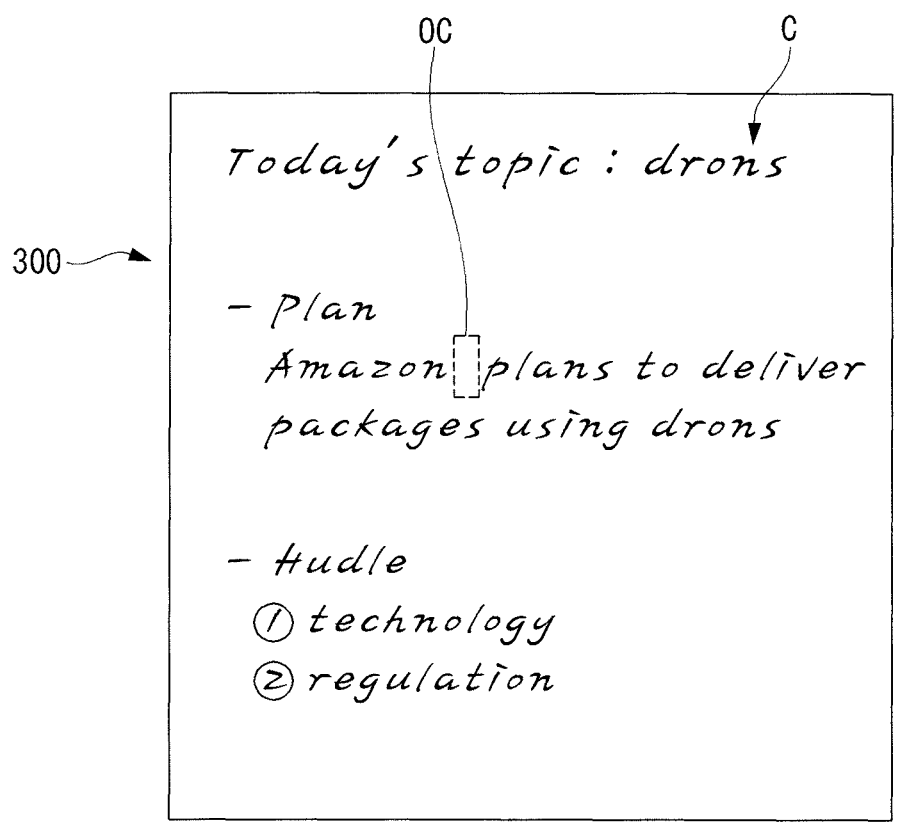

[Figure 30]
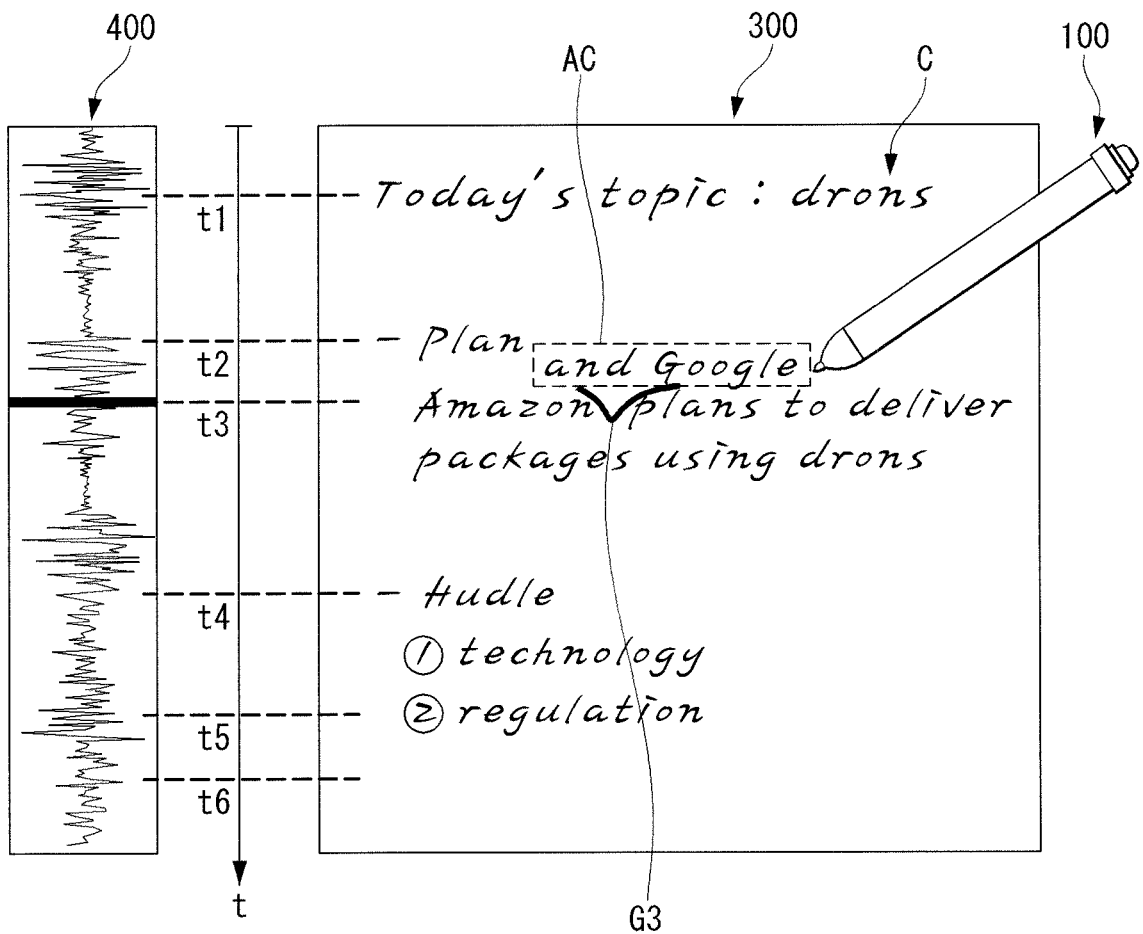

【Figure 31】
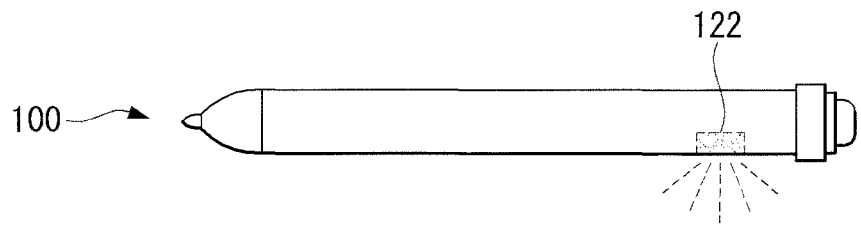
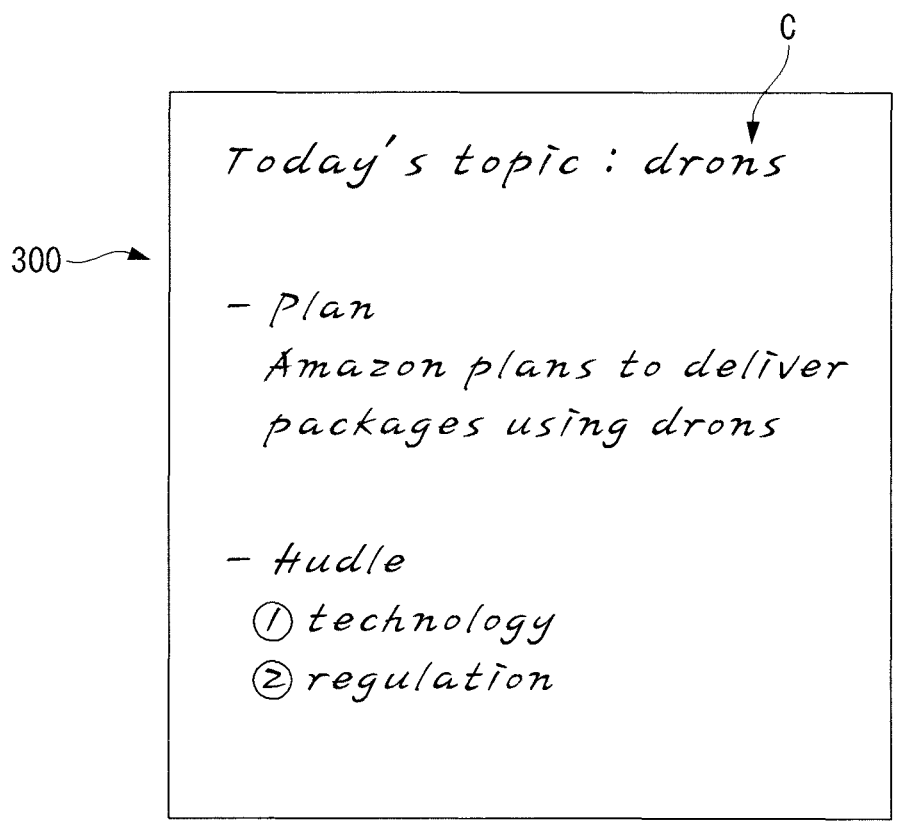

[Figure 32]
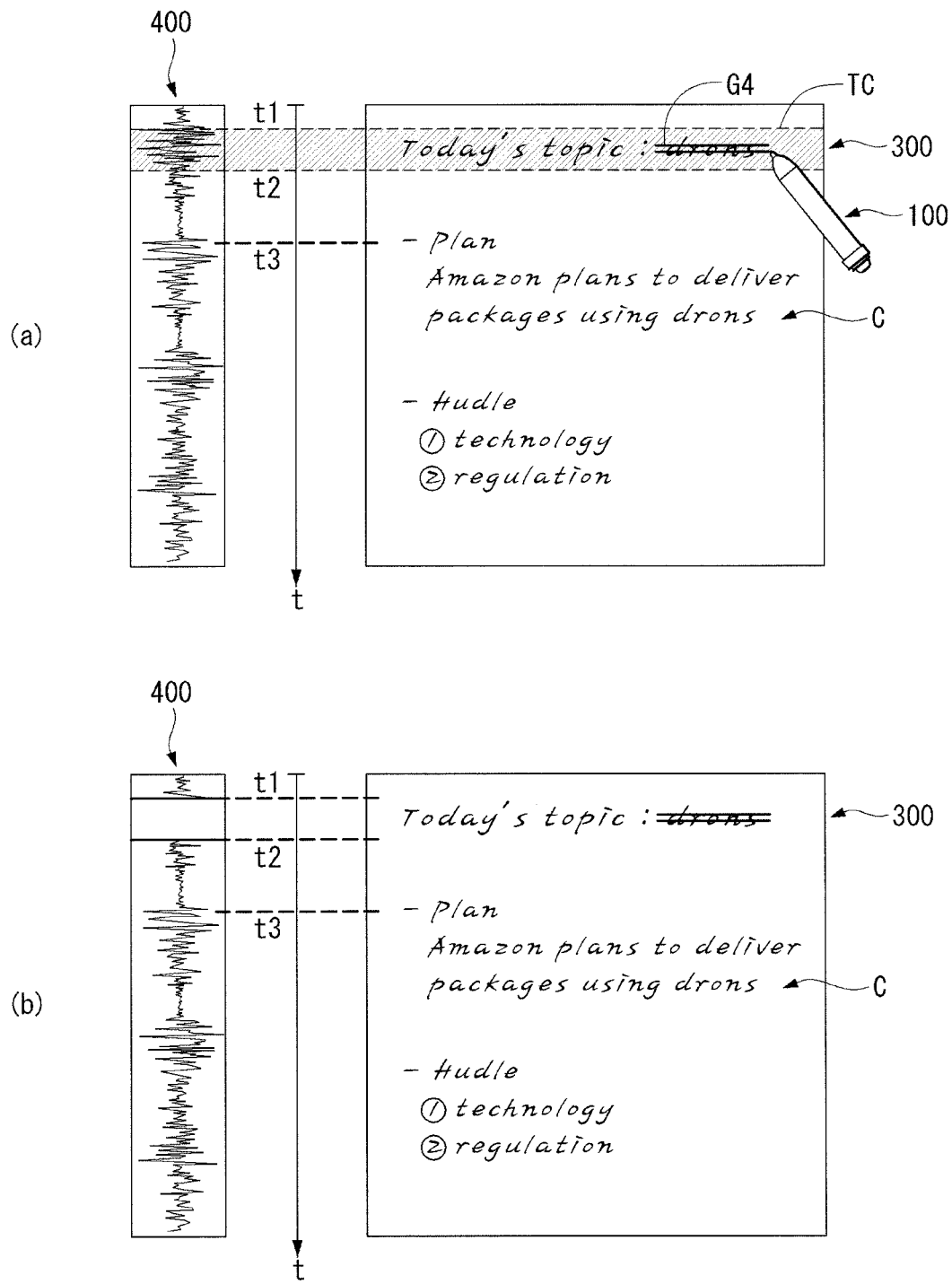

[Figure 33]
(a)
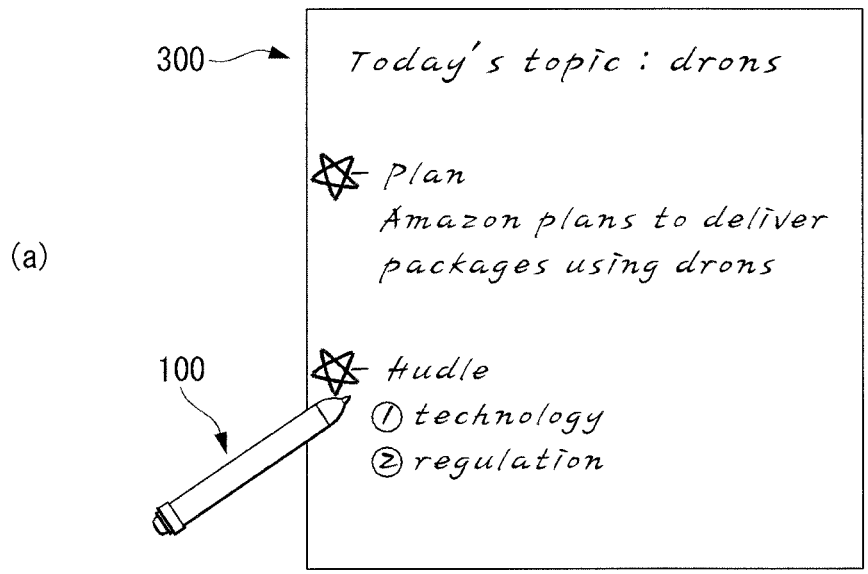
(b)
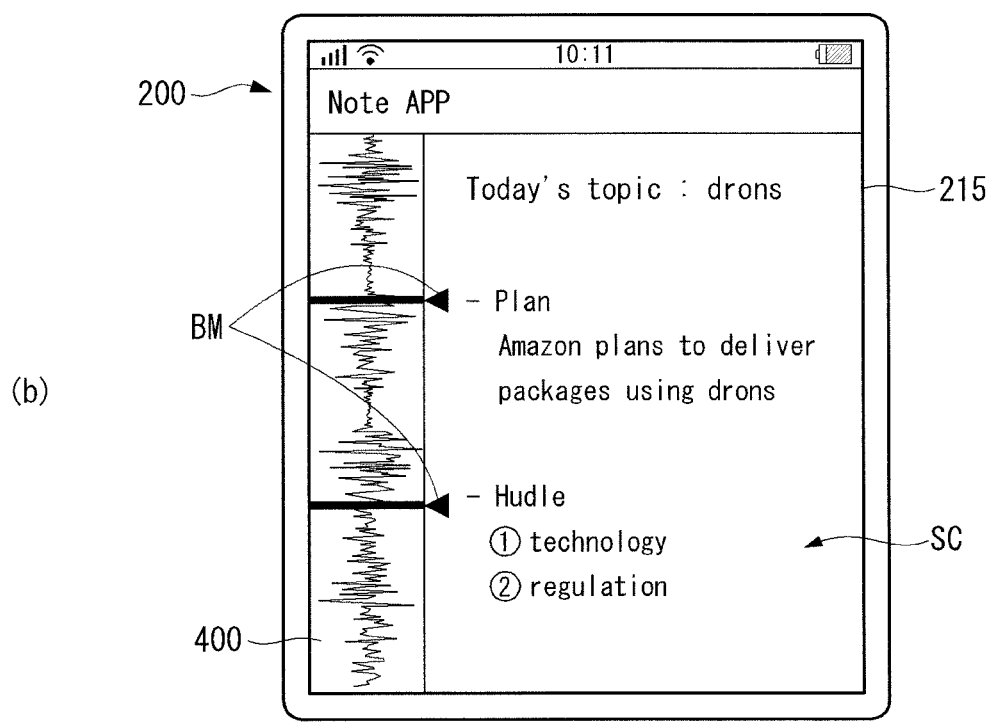

【Figure 34】
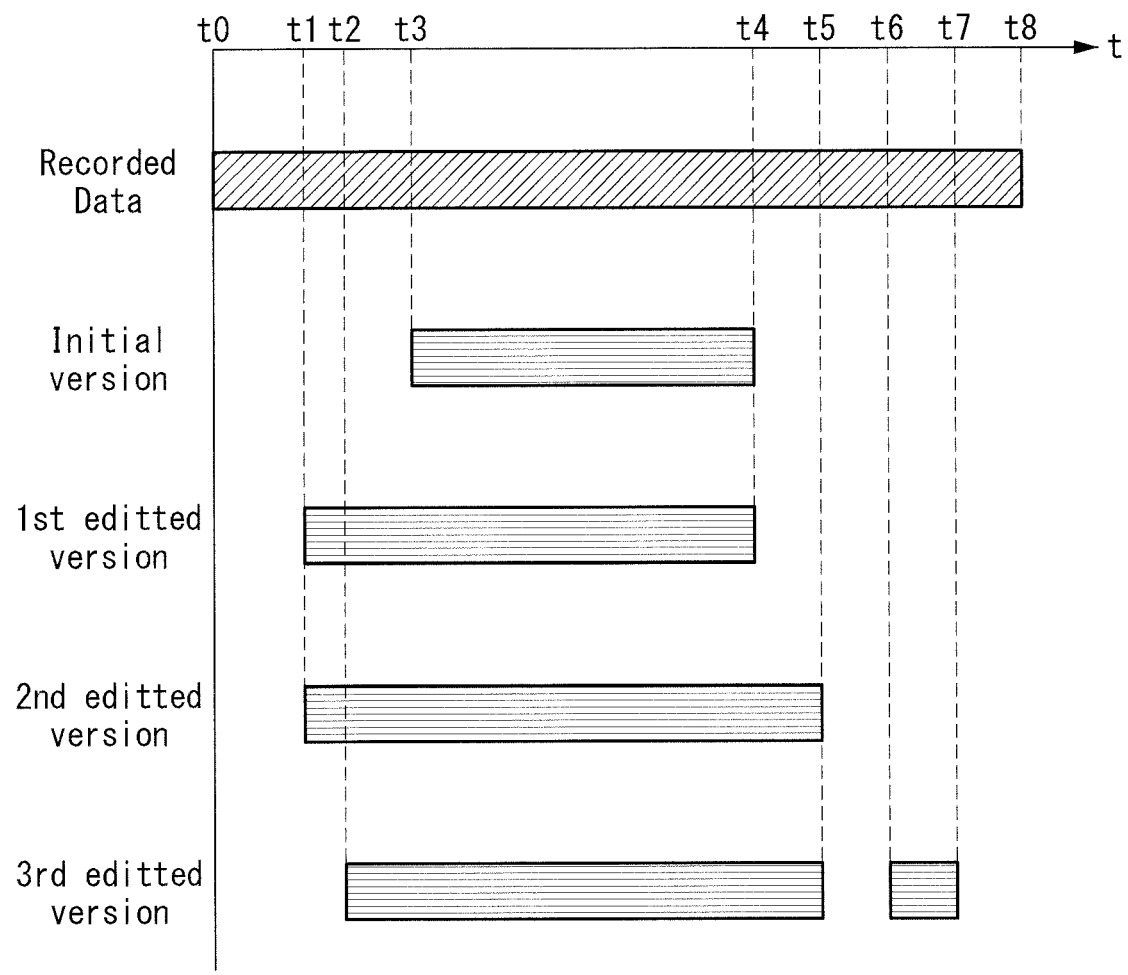

ELECTRONIC DEVICE AND CONTROL METHOD THEREFOR

CROSS REFERENCE TO THE RELATED APPLICATIONS

This application is the National Phase of PCT International Application No. PCT/KR2015/008202, filed on Aug. 5, 2015, which claims priority under 35 U.S.C. § 119(a) to Patent Application No. 10-2015-0092120, filed in Republic of Korea on Jun. 29, 2015, all of which are hereby expressly incorporated by reference into the present application.

BACKGROUND OF THE INVENTION

Field of the Invention

The present invention relates to an electronic device and a method for controlling the same capable of operating in different modes depending on user manipulation performed thereon.

Related Art

Electronic devices may be divided into a mobile type and a fixed type according to mobility. Mobile electronic devices may be divided into a portable electronic device and a stationary type electronic device according to user portability.

Electronic devices are diversified. For example, electronic devices are divided into conventional types such as a bar type and wearable types which may be used in various situations.

Recently, research on electronic devices taking the forms of existing objects is in progress in order to provide analog sensibility.

SUMMARY OF THE INVENTION

An object of the present invention is to solve the aforementioned problem and other problems. Another object of the present invention is to provide an electronic device and a method for controlling the same capable of operating in different modes depending on user manipulation performed thereon.

According to an aspect of the present invention to accomplish the above objects or other objects, there is provided an electronic device including: a housing providing a grip portion in which a plurality of fingers of one hand of a user is contacted; a microphone included in the housing; a memory included in the housing; a sensor located at least one side of the housing; and a controller configured to operate in at least one of a first mode, a second mode and a third mode, wherein in the first mode, a sound acquired through the microphone and content acquired through the sensor are stored in the memory, wherein in the second mode, the sound stored in the memory is reproduced, wherein in the third mode, at least a portion of the stored sound is edited according to an operation for the content based on an operation of the user acquired through the sensor.

The controller may switch the mode when at least one of a preset specific gesture, posture, character and symbol is input using the gripped housing.

The controller may add a tag to at least one of the acquired sound and the acquired content, the tag being in association with a specific point of the acquired sound.

The mode may include a fourth mode for transmitting at least one of the stored sound and content to at least one other terminal so that the transmitted sound and content are reproduced in association with each other.

When an operation of deleting at least a portion of the content from the user griping the housing is acquired in the third mode, the controller may delete a portion of the stored sound corresponding to the deleted at least a portion of the content.

When an operation of adding a new content of to the content from the user griping the housing is acquired in the third mode, the controller may add a tag corresponding to the new content to the stored sound.

The controller may activate the microphone regardless of starting and ending of the first mode, and store the sound.

The electronic device may further include a tip located at one end of the housing which is a point of contact with other object and leaving the trajectory on the contacted other object.

The controller may selectively activate the tip according to the mode.

The electronic device may further include a wireless communication unit for transmitting the content stored in the memory to at least one other device.

According to another aspect of the present invention, there is provided a method for controlling an electronic device including: acquiring an operation by a user for a housing providing a grip portion in which a plurality of fingers of one hand of a user is contacted; operating in a first mode for storing a sound acquired through a microphone and content acquired through a sensor in a memory; operating in a second mode for reproducing the sound stored in the memory; and operating in a third mode for editing at least a portion of the stored sound according to an operation for the content based on an operation of the user acquired through the sensor.

The first to third modes may be switched when at least one of a preset specific gesture, posture, character and symbol is input using the gripped housing.

The method may further include adding a tag to at least one of the acquired sound and the acquired content, the tag being in association with a specific point of the acquired sound.

The method may further include a fourth mode for transmitting at least one of the stored sound and content to at least one other terminal so that the transmitted sound and content are reproduced in association with each other.

The method may further include activating the microphone regardless of starting and ending of the first mode, and storing the sound.

The electronic device and the method for controlling the electronic device according to the present invention have the following advantages.

According to at least one embodiment of the present invention, it is possible to provide an electronic device capable of operating in different modes depending on user manipulation performed thereon.

The above and other aspects of the present invention will be described in detail through preferred embodiments with reference to the accompanying drawings so that the present invention may be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims.

BRIEF DESCRIPTION OF THE DRAWINGS

FIG. 1 illustrates an electronic device according to some embodiments of the present invention.

FIG. 2 illustrates electronic elements of the electronic device according to some embodiments of the present invention.

FIG. 3 illustrates a pin according to some embodiments of the present invention.

FIGS. 4 to 6 illustrate housings according to other embodiments of the present invention.

FIGS. 7 and 8 illustrate tips according to some embodiments of the present invention.

FIG. 9 illustrates an optical sensor according to some embodiments of the present invention.

FIGS. 10 and 11 illustrate modes of the electronic device according to some embodiments of the present invention.

FIG. 12 illustrates an electronic device tip according to other embodiments of the present invention.

FIGS. 13 and 14 illustrate operations of the electronic device according to some embodiments of the present invention.

FIG. 15 is a block diagram for describing an electronic device related to the present invention.

FIGS. 16 to 19 are a flowchart illustrating an operation of the electronic device according to one embodiment of the present invention.

FIGS. 20 to 22 illustrate an electronic device operating in a first mode.

FIGS. 23 to 25 illustrate an electronic device operating in a second mode.

FIGS. 26 and 34 illustrate an electronic device operating in a third mode.

DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected to" another element, the element may be connected with the other element or intervening elements may also be present. In contrast, when an element is referred to as being "directly connected to" another element, there are no intervening elements present.

A singular representation may include a plural representation unless it represents a definitely different meaning from the context.

Terms such as "include" and "has" are used herein and should be understood that they are intended to indicate the existence of several components, functions or steps, disclosed in the specification, and it is also understood that greater or fewer components, functions, or steps may likewise be utilized.

Electronic devices presented herein may be implemented using a variety of different types of terminals. Examples of such terminals include cellular phones, smartphones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of electronic devices. However, such teachings apply equally to other types of terminals, such as those types noted above. In addition, these teachings may also be applied to stationary terminals such as digital TVs, desktop computers, digital signage and the like.

It should be understood that implementing all of the components illustrated in FIGS. 1 to 15 is not a requirement, and that greater or fewer components may alternatively be implemented.

FIG. 1 illustrates an electronic device according to one embodiment of the present invention.

An electronic device 100 may include a housing 101, a tip 102, a sensor 103, a microphone hole 104 for a microphone, a clip 105, a sensor 106, a speaker 107 and a cap 108. More specifically, the housing 101 may take an elongated shape. The housing 101 may be for gripping convenience of a user. For example, the housing 101 may have an elongated cylinder shape.

One end of the tip 102 may be sharp. The other end of the tip 102 may be combined with one end of the housing 101. The tip 102 may be combined with one end of the housing 102 such that the user may grip the housing 102 and write with the tip 102. The tip 102 may be made of a flexible material or a rigid material. The tip 102 may include a pressure sensor 149 therein, which will be described later.

The sensors 103 and 106 may be provided to the outer face of the housing 101. The sensors 103 and 106 may include a sensor for sensing whether the user grips the housing, a sensor for recognizing a fingerprint of the user, a sensor for recognizing a retina of the user and a camera module including an image sensor. In addition, the sensors may be provided on buttons. The user may push the sensors with a finger to execute functions assigned thereto. A sensor may be configured to execute a function of an input device of another electronic device such as a mouse by using the aforementioned pressure sensor of the tip 102 and a button. Functions of sensors may be configured in various manners as necessary.

The microphone may be included in the housing 101 and a microphone hole 104 may be formed in the housing 101. The speaker may be included in the housing 101 and a speaker hole 107 may be formed in the housing 101. A recording function, a multimedia function, a voice transmission/reception function, and the like may be implemented according to a selective or integrated configuration of the microphone and the speaker.

The clip 105 may be combined with one side of the housing 101 or integrated with the housing 101. The cap 108 may be combined with the end of the housing 101 opposite the side combined with the top 102. The cap 108 may be a cover of an opening of the housing 101 or a button and may include a pressure sensor. The function of the cap 108 may be configured in various manners as necessary.

FIG. 2 illustrates electronic elements of the electronic device according to one embodiment of the present invention. The electronic elements may include a PCB 99, a gyro sensor 143, an acceleration sensor 144, an angular acceleration sensor 145, a finger scan sensor 146, an eye-tracking sensor 147, and a pressure sensor 149.

More specifically, components of the electronic device which will be described with reference to FIG. 15 may be mounted on the PCB 99 or an FPCB 98. A connector 97 may be mounted on the PCB 99. The connector 97 may be electrically connected to an external terminal 96. The connector 97 and the external terminal 96 may be data transfer lines or wires for supplying power.

The gyro sensor 143 may be an element which measures repulsive power generated when an object including a gyroscope rotates and converts the repulsive power into an electrical signal. The gyro sensor measures motion of an object in an inertial coordinate system to sense a moving distance and direction and may recognize a path of the object in three-dimensional space. For example, the gyro sensor 143 may be a MEMS gyro sensor.

The acceleration sensor 144 may sense intensity of acceleration or impact of a moving object. The acceleration sensor 144 measures motion of an object in the inertial coordinate system and may recognize a path of the object. For example, the acceleration sensor 144 may be a MEMS acceleration sensor.

For example, if an object moves in two dimensions, one gyro sensor 143 and two acceleration sensors 144 are needed. If an object moves in three dimensions, as another example, three gyro sensors 143 and three acceleration sensors 144 are needed.

The angular acceleration sensor 145 may be a gyro sensor which senses rotational motion of an object in the inertial coordinate system. The angular acceleration sensor 145 may be integrated with the gyro sensor 143 and the acceleration sensor 144 to improve sensor sensitivity.

The finger scan sensor 146 may recognize a user by acquiring a digital image of a fingerprint of the user. For example, optical, ultrasonic, and capacitive finger scan sensors may be used.

The eye-tracking sensor 147 may sense a user's eye and recognize the position of a user's gaze by tracking motion of a retina. The pressure sensor 149 may convert a force applied thereto into an electrical signal to measure the magnitude of the force.

FIG. 3 illustrates a pin according to one embodiment of the present invention. The pin 105 may include a holder 105a, a display module 151, a cover 105b and a window 105c.

The holder 105a may be combined with one side of the housing 101 in such a manner that one side of the housing 101 is inserted into the holder 105a or may be integrated with the housing 101. The holder 105a may elastically move with respect to the housing 101. The holder 105a may include a groove 105h in which the display module 151 is mounted.

The display module 151 may include a PCB 151b and a display panel 151a. The PCB 151b may have electronic elements for controlling the display panel 151a mounted thereon. The display panel 151a may be electrically connected to the PCB 151b to display predetermined information. The display module 151 may be a flexible display adapted to elastic motion of the holder 105a.

The cover 105b may be combined with the holder 105a to fix the display module 151 when the display module 151 is mounted in the groove 105h of the holder 105a. The cover 105b may have an opening 105p at a position corresponding to the display module 151. The window 105c may be combined with the opening 105p to protect the display. The window 105c may include a touch window for the purpose of input in addition to display protection.

FIG. 4 illustrates a housing according to another embodiment of the present invention.

The housing 101 may be elongated and have a triangular cross section. When the housing 101 has a triangular cross section, gripping convenience of the user may be improved and rolling of the electronic device 100 may be prevented. The display 151 may be provided to the outer face of the housing 101. The components described with reference to FIGS. 1 to 3 may be included in the housing.

FIG. 5 illustrates a housing according to another embodiment of the present invention.

The housing 101 may be elongated and have a rectangular cross section. When the housing 101 has a rectangular cross section, the area (which may include the area of the display) of one face of the housing 101 may be widened and rolling of the electronic device 100 may be prevented. The display 151 may be provided to a wider outer face of the housing 101. The components described with reference to FIGS. 1 to 3 may be included in the housing.

FIG. 6 illustrates a housing according to another embodiment of the present invention.

The housing 101 may be elongated and have a circular cross section. When the housing 101 has a circular cross section, user convenience may be provided such that the user does not consider directivity of the housing 101. The display 151 may be provided to surround at least part of the outer surface of the housing 101. Accordingly, a display with a wider area may be provided. Furthermore, a display with an infinite area may be provided in such a manner that information displayed on the display is scrolled as the cylindrical display rotates. The components described with reference to FIGS. 1 to 3 may be included in the housing.

FIG. 7 illustrates a tip according to another embodiment of the present invention.

One side of the tip 102 is combined with the housing 101 and the other side may have a narrower cross section than the one side thereof. This means that the tip 102 tapers from the housing 101. The end of the tip 102 may be rounded. The tip 102 may be made of an elastic material. The tip 102 may be made of a rigid material. A predetermined displacement or deformation may occur in the tip 102 according to force applied thereto. Such displacement or deformation may be sensed by the pressure sensor 149.

FIG. 8 illustrates a tip according to another embodiment of the present invention.

The tip 102 may be formed as multi-stage protrusions. An optical sensor 148 may be provided to one side of the tip 102. The optical sensor 148 may sense a motion (or trajectory) of the tip. The optical sensor 148 may emit a laser to the tip and measure the laser reflected from the surface of the tip to track a motion of the tip 102. Accordingly, the electronic device is not limited to write on any surface or any attributes of writing area.

FIG. 9 illustrates an optical sensor according to one embodiment of the present invention.

The optical sensor 148 may emit a laser. The emitted laser may be reflected from a writing surface. Some light may be deviated from the range of the optical sensor 148 and some light may be measured within the range of the optical sensor 148 depending on the writing surface. For example, the optical sensor 148 may have specifications of a resolution of 2000 dpi, a motion velocity of 0 to 1000 mm/sec, optical power of 0.3 mW and a wavelength of 850 nm.

FIG. 10 illustrates an electronic device mode according to one embodiment of the present invention.

The electronic device mode illustrated in FIG. 10 may be a writing mode. When the user grips the electronic device 100 and writes, the tip 102 is moved (or follows a trajectory) according to user's intention and the optical sensor 148 measures such motion or trajectory and transmits a signal corresponding to the measurement result to a controller 180. The controller 180 may process the signal transmitted from the optical sensor 148 and store the processed signal in a memory 170. For example, when the user writes (RA) a character WC corresponding to the letter "a", the optical sensor 148 measures the motion of the tip 102 and the controller 180 may process a signal output from the optical sensor 148 and store information RC of character "a" in the memory 170.

FIG. 11 illustrates an electronic device mode according to another embodiment of the present invention.

The electronic device mode illustrated in FIG. 11 may be a writing mode. When the user grips the electronic device 100 and writes, the tip 102 is moved (or follows a trajectory) according to user's intention and a sensor module measures such motion or trajectory and transmits a signal corresponding to the measurement result to the controller 180. The sensor module may include the gyro sensor 143, the acceleration sensor 144 or the angular acceleration sensor 145. The position of the sensor module may be close to the tip 102 or separated from the tip 102. The position of the sensor module is not limited as long as measurement sensitivity is secured. The controller 180 may process the signal transmitted from the sensor module and store the processed signal in the memory 170. For example, when the user writes a character WC corresponding to the letter "a", the sensor module measures the motion of the tip 102 and the controller 180 may process a signal output from the sensor module and store information RC of character "a" in the memory 170. Here, the sensor module may measure a motion or a trajectory of the housing 101 and transmit a signal corresponding to the measurement result to the controller 180.

FIG. 12 illustrates a tip of the electronic device according to another embodiment of the present invention.

The electronic device 100 may include a nib 102r. The nib 102r may be refill ink for ballpoint pens, a water-based or oil-based pen, a lead, electronic ink, or the like. The tip 102 may include a fastening hole 102h for combining the nib 102r therewith. The fastening hole 102h may be formed in the tip 102 or formed in the tip 102 and the housing 101. The optical sensor 148 may be positioned near the nib 102r. Accordingly, the user may write a note, and the note may be digitalized and stored. For example, when the user attends a lecture, the user may write the contents of the lecture and the written contents may be stored as digital text. In addition, the written contents may be transmitted to another electronic device simultaneously with writing. When the user delivers a lecture as another example, the user may write the contents of the lecture simultaneously with lecture and the written contents may be stored as digital text and transmitted to attendees. Accordingly, users may concentrate on the lecture without the need to write down the contents of the lecture.

FIG. 13 illustrates an operation of the electronic device according to one embodiment of the present invention.

As shown, the electronic device 100 according to an embodiment of the present invention may perform a communication function.

As illustrated in FIG. 13(a), the electronic device 100 may directly communicate with an access point (AP). For example, the electronic device 100 may transmit data to the AP using a wireless antenna embedded therein and receive data from the AP. This feature differs from conventional devices subordinate to another terminal owned by a user.

As illustrated in FIG. 13(b), the electronic device 100 communicating with the AP may transmit data to another electronic device 200. For example, the electronic device 100 may relay data to the electronic device 200 paired therewith.

FIG. 14 illustrates an operation of the electronic device according to one embodiment of the present invention.

As shown, the electronic device 100 according to an embodiment of the present invention may store and/or transmit content WC in various manners.

As illustrated in FIG. 14(a), the user may generate the content WC using the electronic device 100. For example, the user may write letters using the electronic device 100 in the form of a pen. The electronic device 100 may recognize the letters which is the content WC generated by the user using an optical sensor and/or an acceleration sensor.

The electronic device 100 may store the content WC generated by the user in a text format and/or an image format in the memory 170 included in the electronic device 100. That is, the controller 180 of the electronic device 100 may recognize the content WC generated by the user and store the content WC in the text format such that the entire storage capacity does not increase. When the content WC cannot be easily recognized or the content WC is a picture, the controller 180 may store the content WC in the image format.

As illustrated in FIG. 14(b), the controller 180 may synchronize the electronic device 100 with another device 200. During synchronization with the other device 200, the controller 180 may transmit the content WC stored in the memory 170. Synchronization with the other device 200 may be performed when the electronic device 100 is in an idle state.

The controller 180 may synchronize the content WC stored in the memory 170 with an external server S and transmit the content WC to the external server S.

The controller 180 may delete the content WC synchronized with the other device 200 and/or the external server S from the memory 170. That is, the controller 180 may delete synchronized data in order to free up space of the memory 170.

FIG. 15 is a block diagram for describing the electronic device related to the present invention.

The electronic device 100 may include a wireless communication unit 110, an input unit 120, a sensor 140, an output unit 150, an interface 160, the memory 170, the controller 180 and a power supply unit 190. The components illustrated in FIG. 15 are not essential for implementing the electronic device and thus the electronic device described in the specification may have greater or fewer components.

More specifically, the wireless communication unit 110 among the aforementioned components may include one or more modules which enable wireless communication between the electronic device 100 and a wireless communication system, between the electronic device 100 and another electronic device or between the electronic device 100 and an external device. In addition, the wireless communication unit 110 may include one or more modules which connect the electronic device 100 to one or more networks.

The wireless communication unit 110 may include at least one of a broadcast reception module 111, a mobile communication module 112, a wireless Internet module 113, a short-range communication module 114 and a position information module 115.

The input unit 120 may include a camera 121 or an image input unit for image signal input, a microphone 122 or an audio input unit for audio signal input, and a user input unit 123 (e.g., a touch key, a mechanical key, etc.) through which a user inputs information. Audio data or image data collected by the input unit 120 may be analyzed and processed into a control command of the user.

The sensor 140 may include one or more sensors for sensing at least one of information in the electronic device, information on surrounding environments of the electronic device and user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., the camera 121), the microphone 122, a battery gauge, environment sensors (e.g., a barometer, a hygrometer, a thermometer, a radioactive sensor, a heat sensor, a gas sensor, etc.), the gyro sensor 143, the acceleration sensor 144, the angular acceleration sensor 145, the finger scan sensor 146, the eye-tracking sensor 147 and the optical sensor 148 which have been described with reference to FIG. 2. The electronic device disclosed in the specification may combine information sensed by at least two of these sensors and use the same.

The output unit 150 generates visual, auditory or tactile output and may include at least one of a display unit 151, an audio output unit 152, a haptic module 153 and an optical output unit 154. The display unit 151 may implement a touchscreen by forming a layered structure with a touch sensor or by being integrated with the touch sensor. Such a touchscreen may serve as the user input unit which provides an input interface between the electronic device 100 and the user and, simultaneously, provide an output interface between the electronic device 100 and the user.

The interface 160 serves as a path to various external devices connected to the electronic device 100. The interface 160 may include at least one of a wired/wireless headset port, an external charger port, a wired/wireless data port, a memory card port, a port for connecting a device including an identification module, an audio input/output (I/O) port, a video I/O port and an earphone port. The electronic device 100 may perform appropriate control related to an external device connected thereto in response to connection of the external device to the interface 160.

The memory 170 stores data supporting various functions of the electronic device 100. The memory 170 may store various application programs (or applications) executed in the electronic device 100, data and commands for operation of the electronic device 100. At least part of such application programs may be downloaded from an external server through wireless communication. In addition, at least part of such application programs may have been installed in the electronic device 100 when the electronic device 100 is delivered for basic functions (e.g., call sending and receiving function, message sending and receiving functions) of the electronic device 100. The application programs may be stored in the memory 170 and installed in the electronic device 100 such that the application programs may be executed by the controller 180 to perform operations (or functions) of the electronic device.

The controller 180 controls the overall operation of the electronic device 100 in addition to operations related to the application programs. The controller 180 may process signals, data, information and the like input or output through the aforementioned components and execute the application programs stored in the memory 170 to provide or process information or functions suitable for the user.

In addition, the controller 180 may control at least part of the components described with reference to FIG. 15 in order to execute the application programs stored in the memory 170. Furthermore, the controller 180 may combine at least two of the components included in the electronic device 100 and operate the same in order to execute the application programs.

The power supply unit 190 is provided with external power and internal power under the control of the controller 180 and supplies power to each component included in the electronic device 100. The power supply unit 190 includes a battery and the battery may be an embedded battery or a replaceable battery.

At least parts of the aforementioned components may cooperatively operate in order to implement operations, control or control methods of the electronic device according to various embodiments which will be described below. In addition, the operations, control or control methods of the electronic device may be implemented in the electronic device according to execution of at least one of the application programs stored in the memory 170.

FIGS. 16 to 19 are a flowchart illustrating an operation of the electronic device according to one embodiment of the present invention.

As shown, the controller 180 of the electronic device 100 according to one embodiment of the present invention may operate in different operation modes based on the intentions of the user.

As shown in FIG. 16, the controller 180 may perform step S10 of activating the electronic device 100.

The electronic device 100 may be in a shape of a pen, as described above. That is, the electronic device may be generally cylindrical shape and may be enlonged in a longitudinal direction.

At the end of the electronic device 100, a tip 102 for ejecting ink may be provided. Therefore, the electronic device 100 may be used as a pen. For example, it means that the electronic device 100 may be used to write letters or the like on paper. The written letters or the like may be recognized by the electronic device 100. That is, it means that memos may be recorded in an analog manner and simultaneously may be recorded in a digital manner.

The controller 180 may selectively activate the electronic device 100. For example, The controller may deactivate the electronic device 100 when not used by the user and activate the electronic device 100 when used by the user. For example, when the user puts the electronic device 100 on a table or the like, and the predetermined time has elapsed, the controller 180 may deactivate the electronic device 100 to save battery power. The controller 180 may activate the deactivated electronic device 100 when the deactivated electronic device 100 is picked up.

The controller 180 may selectively activate only a specific function among the functions of the electronic device 100. For example, the controller may selectively activate a tip 102. That is, the controller may activate ink ejection through the tip 102 when writing is required on paper or the like, and deactivate ink ejection through the tip 102 when writing is not needed.

The controller 180 may perform step S20 of proceeding to the first mode. The first mode may be a mode for storing the sound acquired through the microphone 152 or the like and the content acquired through the sensor 140 in the memory 170. For example, the first mode may be a case when operating in a state in which the user who holds a grip portion of the electronic device 100 is writing a character or the like using the electronic device 100. The grip portion may be a certain region above the tip 102 in a pen-shaped electronic device. That is, the grip portion may be a region where a plurality of fingers of one hand of the user is contacted.

The controller 180 may recognize characters and the like written by the user through the sensor 140 and/or the optical sensor 148 as described above.

The controller 180 may perform the step S30 of proceeding to the second mode. The second mode may be a mode in which the sound and content stored in the memory 170 are reproduced in association with each other. That is, it means that the sound and content may be stored in the first mode and may be reproduced in the second mode.

The controller 180 may perform step S40 of proceeding to the third mode. The third mode may be a mode for editing at least a portion of the stored sound according to a user input for the content. For example, the third mode may be an edit mode for sound and/or content. In the third mode, when there is a user's specific operation through the sensor 140, the controller 180 may edit the content corresponding the user's specific operation. For example, when an operation of deleting a portion of the content is performed, the stored sound corresponding to the deleted portion of the content may be deleted together. Through such editing, the user may perform the editing more conveniently, as well as sense and feel the analog sensibility.

As shown in FIG. 17, in the first mode, the controller 180 may perform the step S22 of activating the microphone 152. The activated microphone 152 may record an external sound.

The controller 180 may perform the step S24 of acquiring content. The content may be obtained when the electronic device 100 is used as a pen. For example, when the controller obtains the letters written on other object such as paper by the user as data, and the obtained data may be the content. Such a case may be easily understood when assuming that content of a lecture is written while recording sound of the lecture.

The controller 180 may perform the step S26 of storing the sound and the content in association with each other. For example, in the case of recording sound for 50 minutes, it is possible to index which portion of the sound corresponds to the acquired content in units of 10 minutes. Alternatively, main portions of the sound and the content may automatically be matched to each other.

As shown in FIG. 18, in the second mode, the controller 180 may perform the step S32 of activating a speaker.

The controller 180 may perform the step S34 of reproducing the sound and the content in cooperation with each other. The sound and the content may be generated substantially simultaneously, as described above. In other words, it means that the user write the content of the lecture while recording the sound of the lecture. Therefore, when the sound and the content are reproduced, an indicator indicating which part of the content the currently playing sound corresponds to can be displayed.

As shown in FIG. 19, in the third mode, the controller 180 may perform the step S42 of acquiring a gesture for a specific portion of the content. That is, the controller may obtain a gesture in which the user gripping the electronic device 100 writes a specific symbol to a specific position of the content. For example, the controller may obtain a gesture in which the user draws two lines horizontally on a specific portion of the content by using the tip 102 of the electronic device 100.

The controller 180 may perform the step S44 of editing a specific portion of the content and/or the sound according to a type of the gesture. That is, the controller may edit the content according to the gesture obtained from the user. For example, when an operation of drawing two lines horizontally is obtained as described above, the controller 180 may delete the sound corresponding to the portion of the content to which the operation is applied from the memory 170. The sound deleted from the memory 170 may not be reproduced thereafter.

FIGS. 20 to 22 illustrate an electronic device operating in a first mode.

As shown, the electronic device 100 according to one embodiment of the present invention may acquire and store a content corresponding to a gesture using electronic device 100 and a sound.

As shown in FIG. 20, a user of the electronic device 100 may use the electronic device 100 by gripping it. The electronic device 100 may be used on an object 300, such as paper. That is, characters, symbols, pictures, and the like may be input while the tip 102 of the electronic device 100 is in contact with the object 300.

The user U may record the voice of the other person P1 using the microphone 122 of the electronic device 100.

As shown in FIG. 21, the user of the electronic device 100 may perform writing on the object 300 using the electronic device 100. For example, the user U may write the content C on the object 300, which is paper using the tip 102 of the electronic device 100.

As shown in FIG. 22, the recorded sound data 400 may correspond to the content C described on the object 300. For example, specific points of the content C may be matched so as to correspond to specific time points t1, t2, and t3 of the sound data 400. For example, it means that tags corresponding to specific points of the content C may be added to the sound data 400.

FIGS. 23 to 25 illustrate an electronic device operating in a second mode.

As shown, the controller 180 of the electronic device 100 according to one embodiment of the present invention may reproduce the sound recorded in the first mode and the content described in the first mode by matching each other.

As shown in FIG. 23, the controller 180 of the electronic device 100 according to one embodiment of the present invention may transmit the stored data to another terminal 200.

The controller 180 of the electronic device 100 may perform the step S110 of storing the sound and the content.

The controller 180 may perform the step S120 of transmitting the stored sound and content to the other terminals 200.

The other terminal 200 may perform the step S130 of storing the received sound and content.

The other terminal 200 may perform the step S140 of reproducing the received sound and content and the step S150 of editing the received sound and content. That is, the production of the sound data and the content data is performed by the electronic device 100, and reproduction of the produced data may be performed by the other terminal 200. Through such production and reproduction distribution, the electronic device 100 may be used more conveniently and efficiently. For example, by allowing content to be displayed on the other terminal 200 that has a larger display than the electronic device, the content may be more easily identified.

The other terminal 200 may perform the step S160 of transmitting the edited sound and content to the electronic device 100.

As shown in FIG. 24, the other terminal 200 that has received data may reproduce the received data. For example, the other terminal may output the received sound through the sound output unit 252 of the other terminal 200, and may display the received content SC on the display 215 of the other terminal 200.

On the display 215, the sound data 400 may be further displayed. For example, the sound data 400 corresponding to all or a part of the received content SC may be displayed. An identifier ID and/or a highlight HL may be further displayed in the sound data 400 and/or the received content SC.

The identifier ID and/or the highlight HL may visually display a position corresponding to the sound data 400 being outputted. For example, the highlight HL may be displayed on the content SC corresponding to the identifier ID on the sound data 400 being outputted.

The mode in which the electronic device 100 transmits and outputs at least one of the sound and the content to be reproduced by the other terminal 200 may be referred to as a fourth mode.

As shown in FIG. 25, a sound may be outputted from the electronic device 100. That is, the sound may be outputted through the microphone 122 of the electronic device 100. The user may watch the content C written by the user on the object 300 while listening to the outputted sound. That is, the user may look at the content described on the object 300 such as paper in an analog state.

FIGS. 26 and 34 illustrate an electronic device operating in a third mode.

As shown, the controller 180 of the electronic device 100 according to one embodiment of the present invention may operate in the third mode for changing the reproduction of the sound and/or editing the sound through an operation for the content.

As shown in FIG. 26, the controller 180 may change an output of the sound data 400 in response to a user's input to the object 300.

As shown in FIG. 26 (a), a sound may be output through the microphone 122 or the like. The output of the sound may be processed in other terminal 200 to which the sound is transmitted. The user may watch the content C written by the user on the object 300 while listening to the outputted sound. The output of sound may be currently in progress at time point t1. The time point t1 may correspond to the beginning of the written content.

As shown in FIG. 26 (b), the user may input a specific symbol using the electronic device 100. For example, the user may perform a first gesture input G1 on the object 300. The first gesture input G1 may be made through the tip 102 at an end of the electronic device 100. When the tip 102 is moved in contact with the object 300, a trajectory corresponding to the first gesture input G1 may remain in the object 300. The controller 180 may obtain the trajectory corresponding to the first gesture input G1 through the optical sensor 148 and/or the gyro sensor 143 or the like.

The first gesture input G1 may be a predetermined symbol for reproducing a portion corresponding to the symbol. Therefore, when the controller 180 acquires the first gesture input G1, the controller 180 may change the reproduction position to the time point t2 corresponding to the symbol. That is, the user may quickly move the reproduction point to a point at which the user wants to reproduce, through the gesture operation with respect to the electronic device 100.

As shown in FIG. 27, a pre-stored sound may be outputted through the microphone 122.

A user who has listened to the sound while confirming the content written on the object 300 may find that a specific portion of the content is missing. That is, it means that the user may be aware that the missing content OC exists at a certain point.

As shown in FIG. 28, the user may add necessary content after performing a specific gesture using the electronic device 100. For example, the user may perform a second gesture input G2 on the object 300 and then write additional content AC.

The controller 180 may match the recorded sound 400 with the content C as described above. For example, the time point t1 to t5 of the recorded sound 400 may be matched to specific points of the content C. Based on the matching the recorded sound 400 and the content C, the controller 180 may selectively reproduce a specific point.

The controller 180 may perform additional matching with respect to the additional content AC. For example, when the time point t6 is the point where the additional content is added, the controller may store that the time point t6 corresponds to the additional content AC. Therefore, when the user selects the additional content AC, the controller 180 may selectively reproduce the sound corresponding to the additional content AC.

As shown in FIG. 29, a sound stored through the microphone 122 may be output. A user who has confirmed the content written on the object 300 while the stored sound is output may find that there is a missing content OC.

As shown in FIG. 30, the user may perform a third gesture input G3 using the electronic device 100. The third gesture input G3 may be a symbol used for adding content to a middle of a sentence.

The user may add additional content AC corresponding to the third gesture input G3.

The controller 180 may detect that the additional content AC has been written.

The controller 180 may associate the sound data 400 with additional contents AC. For example, the controller 180 may add a tag at time point t3 corresponding to the additional content AC. Therefore, when the additional content AC is selected, the controller 180 may reproduce the sound at the time point t3 corresponding the additional content AC.

As shown in FIG. 31, the electronic device 100 may output the stored sound. The user may confirm content written by the user on the object 300 while listening to the outputted sound.

As shown in FIG. 32 (a), the user may perform a gesture that deletes a specific portion of the content described on the object 300. For example, it means that the user may perform a fourth gesture input G4. The fourth gesture input G4 may be an operation for the content described on the object 300. For example, the fourth gesture input G4 may be an operation of drawing a plurality of horizontal lines on a removal content TC.

As shown in FIG. 32 (b), when the fourth gesture input G4 is obtained, the controller 180 may delete a portion corresponding to the removal content TC from the sound data 400. Therefore, when the sound is output at a later time, the portion from the time t1 to the time t2 may not be reproduced. That is, when the sound data 400 is outputted, the sound is output until the time point t1, and then the sound may be reproduced from the time point t2.

As shown in FIG. 33 (a), a user may perform a fifth gesture input G5 using the electronic device 100. The fifth gesture input G5 may be an input specifying a specific portion of content written on the object 300.

As shown in FIG. 33 (b), when the predetermined fifth gesture input G5 is obtained, the controller 180 may add an identification mark BM to the specific portion.

The identification mark BM may be a kind of bookmark function. That is, the identification mark may be an indication that the user intends to distinguish the specific portion from the other portion.

As shown in FIG. 34, the controller 180 may store sound data including a recording time point selected by the user.

The controller 180 may obtain an input for starting storage of sound from the user.

When the input for starting storage of sound is acquired, the controller 180 may store sound from a time point prior to the time point at which the input was acquired. For example, even if the user performs the input operation for starting the storage of sound at the time point t3, the recording may be started from the time point t0 which is some time before the time point t3.

The controller 180 may be activating the microphone 122 for recording prior to the user's operation. For example, the controller may be recording sound by normally activating the microphone 122. If there is no a user's operation, the recorded sound may be removed at the buffer. When the user's operation is input, the sound may be stored in the memory from a time point that is earlier than a time point when the user operation is input.

The controller 180 may perform recording beyond a time point when the user's operation to stop recording is input. For example, even if the user's operation is input at a time point t4, the recording may be performed until a time point t8 when a predetermined time has elapsed from the time point t4. That is, the controller 180 may record the sound from the time point t0 to the time point t8.

An initial version may be a sound between a time point t3 when the user inputs the start of storage and a time point t4 when the user inputs the stop of storage. If there is no operation, the sound corresponding to the initial version may be output in association with the content.

The first edited version may be a version in which a start time point is modified to a time point t1 that is earlier than the start time point of the initial version. Since the sound data of a time range including a time range of the initial version is stored, the start time point of the first edited version may be modified to the time point t1 which is earlier than the start point of the initial version.

The second edited version may be a version in which an end time point is modified to a time point t5 that is later than the end time point of the initial version.

The third edited version may be a version in which the sound is skipped from a time point t4 to a time point t6 and the sound is added from the time point t6 to a time point t7. When the third edited version is reproduced, the sound may be reproduced from the time point t6 to the time point t7 immediately after the sound is reproduced up to the time point t5. That is, it means that seamless reproduction of the third edited version may be possible.

The above-described present invention may be implemented with computer-readable code in a program recorded medium. The computer-readable medium may include all kinds of recording devices capable of storing data readable by a computer system. Examples of the computer-readable medium may include an HDD (Hard Disk Drive), an SSD (Solid State Drive), an SDD (Silicon Disk Drive), a ROM, a RAM, a CD-ROM, magnetic tapes, floppy disks, optical data storage devices, and the like and also include such a carrier-wave type implementation such as transmission over the Internet. Furthermore, the aforementioned computer may include the controller of the electronic device. Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An electronic device comprising:
a housing having an elongated shape and a grip portion for gripping the electronic device to input content;
a microphone included in the housing;
a memory included in the housing;
a sensor located at one side of the housing and configured to sense movement of the electronic device corresponding to the input content; and
a controller configured to:
operate in a first mode in which a sound acquired through the microphone and the content input by the electronic device are stored in the memory,
operate in a second mode in which the sound stored in the memory is reproduced, and
operate in a third mode in which at least a portion of the stored sound is editable according to a gesture acquired through the sensor.

2. The electronic device according to claim 1, wherein the controller is further configured to switch between the first mode, the second mode and the third mode according to at least one of a preset specific gesture of the electronic device, a posture of the electronic device, a character input by the electronic device and a symbol input by the electronic device.

3. The electronic device according to claim 1, wherein the controller is further configured to store a tag to at least one of the acquired sound and the acquired content, the tag being in association with a specific point of the acquired sound.

4. The electronic device according to claim 1, wherein the controller is further configured to operate in a fourth mode for transmitting at least one of the stored sound and content to at least one other terminal so that the transmitted sound and content are reproduced in association with each other on the other terminal.

5. The electronic device according to claim 1, wherein in response to a specific gesture of the electronic device identifying a portion of the content acquired in the third mode, the controller is further configured to delete the identified portion of the content and delete a portion of the stored sound corresponding to the deleted portion of the content.

6. The electronic device according to claim 1, wherein in response to a specific gesture of the electronic device identifying a portion of the content, the controller is further configured to add new content at the identified portion of the content, and add a tag corresponding to the new content to the stored sound.

7. The electronic device according to claim 1, wherein the controller is further configured to activate the microphone regardless of starting and ending of the first mode, and store the sound.

8. The electronic device according to claim 1, further comprising:

a tip located at one end of the housing which is a point of contact with another object and which leaves a trajectory on the contacted other object.

9. The electronic device according to claim 8, wherein the controller is further configured to selectively activate the tip according to whether the electronic device operates in the first mode, the second mode or the third mode.

10. The electronic device according to claim 1, further comprising:
a wireless communication unit for transmitting the content stored in the memory to at least one other device.

11. The electronic device according to claim 8, wherein the electronic device is a writing instrument for writing the trajectory on the contacted other object to input the content.

12. A method of controlling an electronic device including a housing having an elongated shape and a grip portion for gripping the electronic device to input content; a microphone included in the housing; a memory included in the housing; a sensor located at one side of the housing and configured to sense movement of the electronic device corresponding to the input content; and a controller, the method comprising:
operating, via the controller, the electronic device in a first mode in which a sound acquired through the microphone and the content input by the electronic device are stored in the memory;
operating, via the controller, the electronic device in a second mode in which the sound stored in the memory is reproduced; and
operating, via the controller, the electronic device in a third mode in which at least a portion of the stored sound is editable according to a gesture acquired through the sensor.

13. The method according to claim 12, further comprising:
switching between the first mode, the second mode and the third mode according to at least one of a preset specific gesture of the electronic device, a posture of the electronic device, a character input by the electronic device and a symbol input by the electronic device.

14. The method according to claim 12, further comprising:
storing a tag to at least one of the acquired sound and the acquired content, the tag being in association with a specific point of the acquired sound.

15. The method according to claim 12, further comprising:
operating, via the controller, the electronic device in a fourth mode for transmitting at least one of the stored sound and content to at least one other terminal so that the transmitted sound and content are reproduced in association with each other on the other terminal.

16. The method according to claim 12, wherein in response to a specific gesture of the electronic device identifying a portion of the content acquired in the third mode, the method further comprises deleting the identified portion of the content and deleting a portion of the stored sound corresponding to the deleted at least the portion of the content.

17. The method according to claim 12, wherein in response to a specific gesture of the electronic device identifying a portion of the content, the method further comprises adding new content at the identified portion of the content, and storing a tag corresponding to the new content to the stored sound.

18. The method according to claim 12, further comprising activating the microphone regardless of starting and ending of the first mode, and store the sound.

19. The method according to claim 12, wherein the electronic device further includes a tip located at one end of the housing which is a point of contact with another object and which leaves a trajectory on the contacted other object.

20. The method according to claim 19, further comprising:
selectively activating the tip according to whether the electronic device operates in the first mode, the second mode or the third mode.

21. The method according to claim 12, further comprising:
transmitting, via a wireless communication unit, the content stored in the memory to at least one other device.

* * * * *